Figure 1:
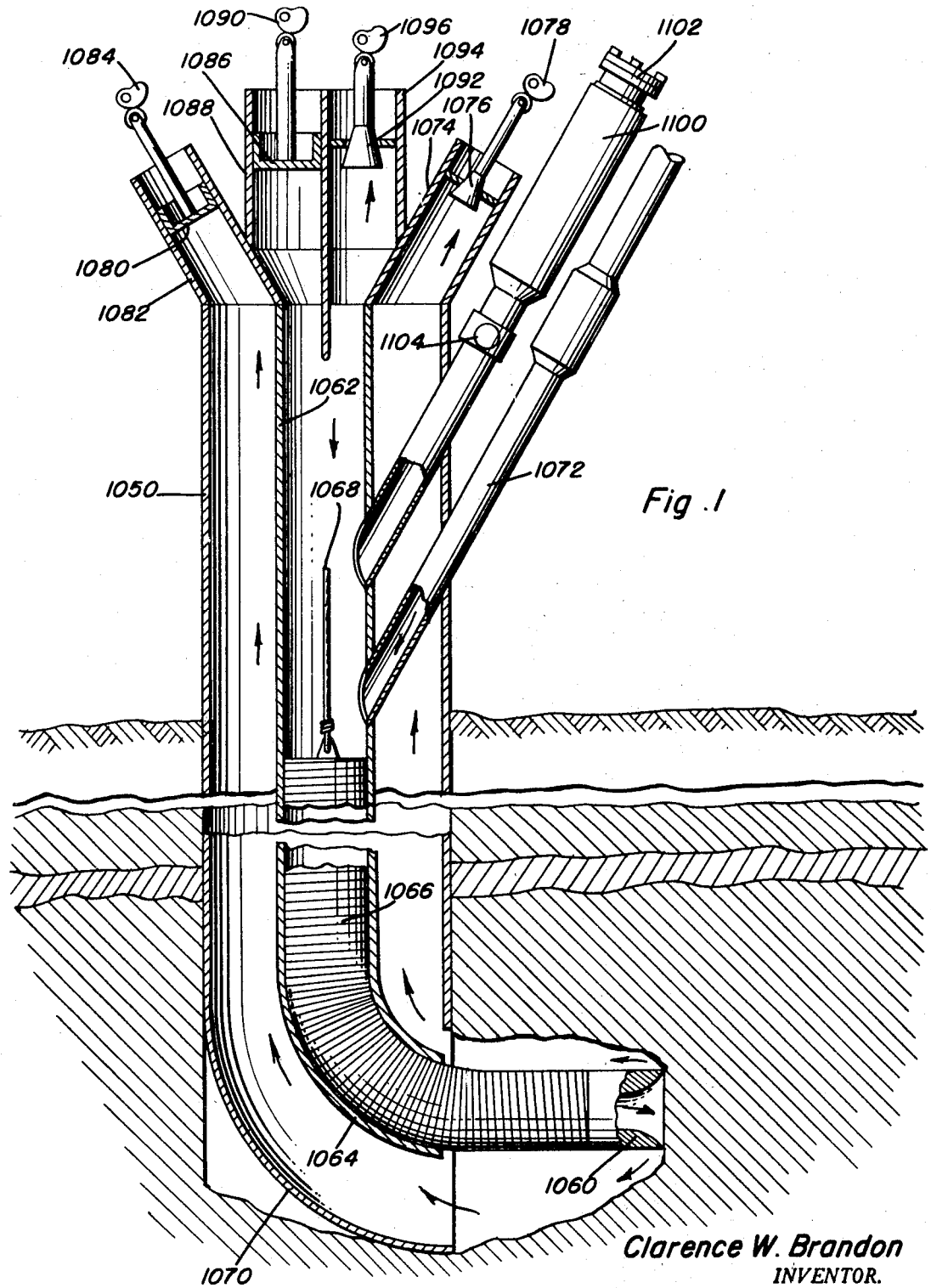
Figure 2:
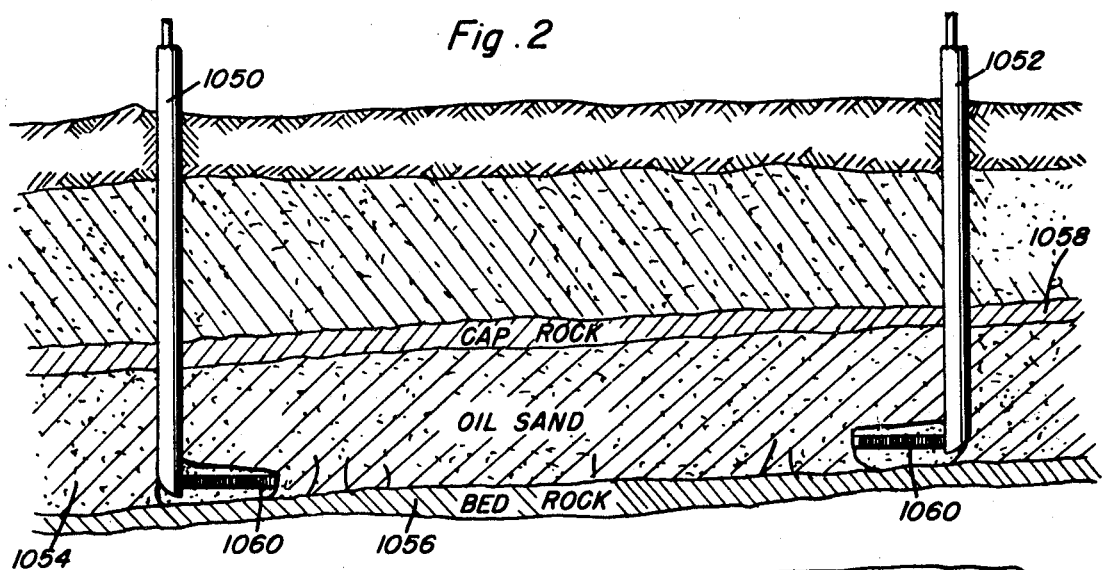

166-307.
02-08-72  OR  3,640,344

United States Patent
Brandon

[15] 3,640,344
[45] *Feb. 8, 1972

[54] FRACTURING AND SCAVENGING FORMATIONS WITH FLUIDS CONTAINING LIQUEFIABLE GASES AND ACIDIZING AGENTS

[72] Inventor: Clarence W. Brandon, Tulsa, Okla.
[73] Assignee: Orpha Brandon, Nashville, Tenn.
[ * ] Notice: The portion of the term of this patent subsequent to Feb. 7, 1984, has been disclaimed.
[22] Filed: Dec. 2, 1968
[21] Appl. No.: 780,385

Related U.S. Application Data

[63] Continuation-in-part of Ser. No. 719,883, Apr. 9, 1968, abandoned.

[52] U.S. Cl. ............................................. 166/307, 166/308
[51] Int. Cl. ................................... E21b 43/26, E21b 43/27
[58] Field of Search ................................... 166/307, 308, 305

[56] References Cited

UNITED STATES PATENTS

| | | | |
|---|---|---|---|
| 2,308,414 | 1/1943 | Campbell | 166/307 |
| 2,661,066 | 1/1953 | Bond | 166/308 X |
| 2,778,427 | 1/1957 | Cardwell | 166/308 X |
| 3,076,762 | 2/1963 | Dill | 166/307 |
| 3,302,720 | 2/1967 | Brandon | 166/249 |
| 3,504,747 | 4/1970 | Vogt, Jr. et al. | 166/307 |

*Primary Examiner*—James A. Leppink

[57] ABSTRACT

A method of fracturing formation with liquefiable gases, liquefiable gases and acidizing agents, and cleansing and scavenging of formations whereby energy waves and high-frequency vibrations may assist in the above.

60 Claims, 14 Drawing Figures

Clarence W. Brandon
INVENTOR.

Clarence W. Brandon
INVENTOR.

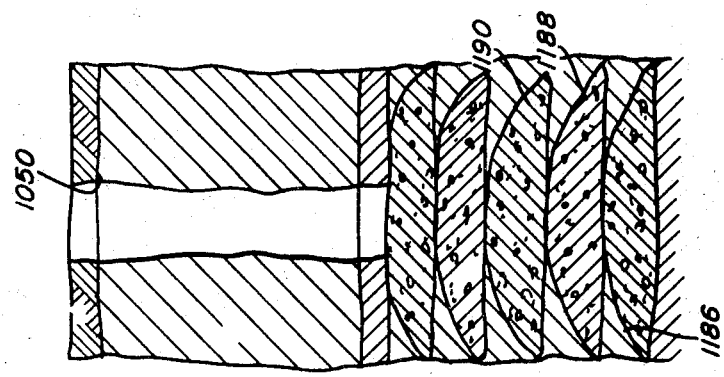
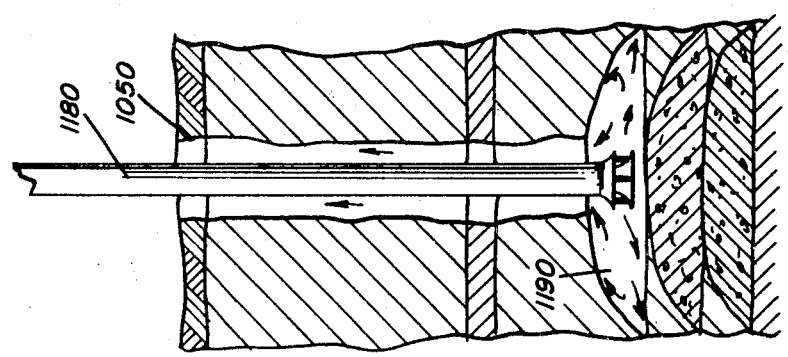
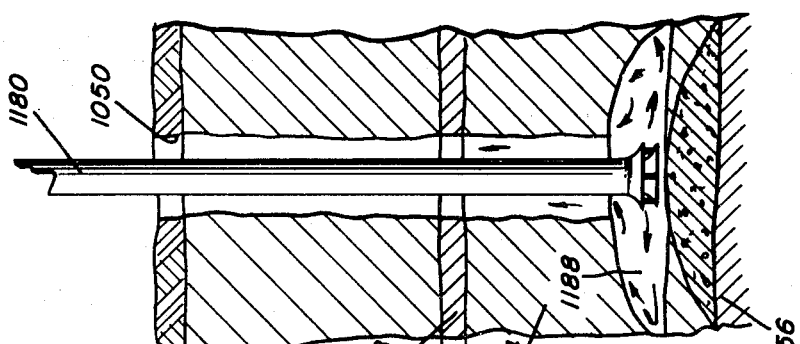
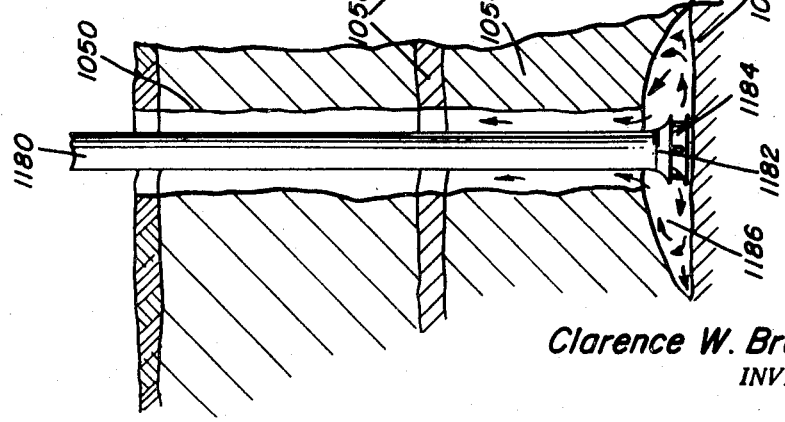

Clarence W. Brandon
INVENTOR.

Clarence W. Brandon
INVENTOR.

FRACTURING AND SCAVENGING FORMATIONS WITH FLUIDS CONTAINING LIQUEFIABLE GASES AND ACIDIZING AGENTS

CROSS-REFERENCES TO RELATED APPLICATIONS

This invention comprises novel and useful methods for treating formations with liquefiable gases and acidizing agents and the use of these methods in various combinations of the use of energy waves and variable high-frequency vibrations therewith in the use of fluid mediums to perform these treating processes and constitutes a continuing application of the following applications: (1) Ser. No. 241,647 filed Aug. 13, 1951, portions of which are now U.S. Pat. No. 2,796,129; (2) Ser. No. 296,038 filed July 27, 1952, portions of which are now U.S. Pat. No. 2,866,509; (3) Ser. No. 491,715 originally filed Mar. 2, 1955, abandoned in favor of continuing application Ser. No. 315,720 filed Oct. 11, 1963 now U.S. Pat. No. 3,220,476; (4) continuing application Ser. No. 665,995 filed June 17, 1957, portions of which are now U.S. Pat. No. 3,302,720; and (5) continuing applications; Ser. No. 611,082 filed Jan. 23, 1967, now copending with the subject application; and a continuation-in-part of application Ser. No. 719,883 filed Apr. 9, 1968, now abandoned.

BACKGROUND OF THE INVENTION

Broadly this invention involves above and below ground well treatment apparatus and methods generally in Class 166 or Class 299 of the present U.S. Pat. Classification definition, and includes subject matter which has been copending since Aug. 13, 1951 portions of which have been divided or otherwise carved therefrom into the aforesaid issued patents and applications.

The prior art before applicant's above filing date is typified by by the Riestle U.S. Pat. No. 2,547,778; Sherborne U.S. Pat. No. 2,670,801; Bodine U.S. Pat. No. 2,355,618 and subsequent Bodine U.S. Pat. Nos. 2,667,932, 2,871,943, 3,016,093, 3,016,095, and Re. 23,381; and subsequent patents to others, namely; Moll et al., U.S. Pat. No. 2,850,098; Martin U.S. Pat. No. 2,964,109; West et al., U.S. Pat. No. 2,975,834; Crawford U.S. Pat. No. 3,004,594; Allen U.S. Pat. No. 3,063,499; Plummer et al., U.S. Pat. No. 3,100,528; Peterson U.S. Pat. No. 3,108,636; and Nielson et al., U.S. Pat. No. 3,310,112.

All of the above references have something in common with this invention either in the use of sonic waves in treating formations, or in the use of various types of fluids in the treating or fracturing of formations, or in the use of liquefiable gases and the scavenging of formations after fracturing or treating of formations by the release of the pressure of the liquefied gas into the well bore or at the surface upon completion of the formation treatment. This invention goes beyond any of the sonic wave references in that various modulations are shown as being able to be added to certain of the sonic wave methods for increased benefit therefrom.

SUMMARY AND OBJECTS

The primary general object of this invention is to provide an apparatus and method for producing high-frequency vibrations in a liquid medium and one wherein the apparatus may be extremely susceptible of adjustment in order to control with great accuracy and precision the force and also both the amplitude and the frequency of the vibrations produced in the medium.

The primary specific object of this invention is to provide an apparatus and method for treating oil-bearing formations with fluid pressure and/or high-frequency vibrations in order to thereby effect or facilitate the recovery of petroleum deposits therefrom.

A more basic and general object is to provide an apparatus and method for generating high-frequency vibrations and producing an energy-carrying wave in a medium, and wherein all of the characteristics of such wave can be controllably varied and applied to widely-diversified uses such as to tunneling, drilling, mining, of various minerals, reductions of ores, pumping, oil well use, various pressing applications, extrusion of materials, recrystallization of materials to increase strength, ice breaking, structure deforming, prestressing or compacting of materials, quarrying, dyeing of fibers and many other uses.

A very important object of this invention is to provide an apparatus and method specifically adapted for use in oil and gas wells and effectively treating the same by fracturing, acidizing, cementing, cleaning, water and gas flooding for the secondary recovery of fluids from producing formations, drilling and for testing operations relative to any of the above.

Another very important object of this invention is to provide an apparatus having extreme adjustability as to all of its phases of operation whereby to facilitate testing as to ranges of pressures, high-frequency vibrations, character of high-frequency vibrations and the like for determining effective treating of oil-bearing formations and for treatment of other objects.

An additional object of this invention is to provide a means for generating energy-carrying waves for treating an oil-bearing formation and for other uses, and wherein the characteristics of said generated waves may be widely and controllably varied and whereby said means shall be highly compact and mobile in nature.

A more specific object of the invention is to provide a variable-stroke pump for generating in a liquid medium energy-carrying waves of various predetermined characteristics.

Another specific object is to provide an energy wave generator wherein the energy content of the generated wave may be increased or decreased by applying or withdrawing heat from the medium supplied to the wave generator.

A still more specific object is to provide an apparatus for producing energy-carrying waves by means of a variably reciprocated piston and wherein a pair of variably timed crankshafts are each adjustably connected to a rocker and slide mechanism driving said piston in order to controllably vary thereby the stroke of the latter.

An additional specific object is to provide a reciprocating piston type of pump, especially adapted for use as a generator of an energy-carrying wave wherein a more perfect and self-compensating counterbalancing of the pump pistons and the various moving parts thereof is obtained.

Still another specific object is to provide a wave-generating pump having means for storing energy therein from the fluid medium with which the pump is associated.

Yet another specific object is to provide a wave-generating pump assembly having a means for adjustably preloading pump and/or counterbalance cylinders with an adjustable fluid pressure.

A further specific object is to provide a reciprocating piston pump assembly specifically adapted for the generation of high-frequency energy-carrying waves in a liquid medium and wherein a pump cylinder and piston and a counterbalance cylinder and piston are interconnected and are each operatively connected with said liquid medium whereby to balance out pulsations and vibrations in the mechanism.

Another object is to provide a valve assembly of general utility and of use as a liquid discharge valve in a generator of energy-transmitting waves.

A further object is to provide a valve assembly together with an actuating mechanism therefor capable of effecting a variably and adjustably timed operation of the valve assembly.

An additional object is to provide a valve assembly wherein the valve is balanced in its action by the pressure of the fluid which it controls whereby to facilitate the actuation and to increase the sensitivity of the valve.

Still another object is to provide an improved packing assembly for a valve and one which may be easily adjusted to take up wear therein during the operation of the valve and without interfering with the latter.

Yet another object is to provide a valve assembly having means for imposing an adjustable preloading force on a valve for urging the latter to its seat.

nozzle and sand face is different from that of piston 1080, since in the first instance the velocity of the medium is added thereto while in the latter it is subtracted therefrom. This difference is utilized to properly time and synchronize the peaks and lows of the two waves to obtain a resultant wave having the desired predetermined peaks and valleys.

In applying this method of tunneling, it is intended that the fluid applied to the sand strata from the casing 1050 shall preferably exceed in pressure the pressure existing within the capillary formation of the oil sand strata. Consequently, the fluid will tend to be driven outwardly from the nozzle into this capillary formation, assisted by the pulsations and vibrations imposed upon the fluid, and toward the adjacent well casings. At the same time, pulsations of a similar character will be produced in the fluid being applied to the nozzle and the adjacent casing 1052. The pulsations from the driving casing 1050, if opposite in phase to that of the "pulling" casing 1052 will guide and augment the penetrative effect, since the oil sand strata therebetween will be subjected to a high pressure adjacent the casing 1050 at the same time that a greatly reduced pressure prevails at the casing 1052. This condition may be maintained for any desired length of time, this length of time being varied during the treating of the formation and is found to be most effective for penetrating the oil sand strata, but will be periodically reversed, whereby the casing 1052 becomes the driving casing and the casing 1050 becomes the pulling casing for the operation. It will be evident that this cycle of reversing the pushing and pulling effect upon the opposite ends of the sand strata between the two casings will tend to extend the tunnel sections toward each other under the pressure impulses and high-pressure conditions prevailing at their nozzles, and the low-pressure region created at one well will pull or guide the flow of pressure fluid from the high-pressure region of the other well casing toward the low-pressure region.

The effectiveness of this driving and guiding action upon the pressure fluid of the tunneling operation will be greatly augmented by the imposing of high-frequency vibrations thereon of predetermined character. The above-mentioned pistons will obviously be capable of variation in the extent and rate of their travel, to enable the attaining of any desired rate and amplitude of pulsations within the fluid medium. As will be understood, the form of apparatus set forth in the preceding sections of this application may also be effectively applied for this purpose.

The opening and subsequent sudden closing of the pressure medium discharge valves 1076 and 1092 with predetermined timing and adjustable rates of movement will set up, by a ram action, a hammering effect in the fluid columns of the tubing and of the casings. As is well known, this hammering effect is capable of producing relatively enormous and rapid pressure oscillations in the fluid column which will be transmitted and directed by the nozzle portions 1060. These oscillations will be imposed upon the above-mentioned fluctuations and vibrations, and may be united and combined to augment the pressure peaks or drops to further increase their differences. By using the appropriate combinations of one or both of the pistons and valves, an infinite variety of resultant frequencies of pulsations or vibrations are possible. As will be readily understood, the paths of travel of the fluid medium will be relatively wide adjacent the well casings from which they originate, and will tend to thin out or narrow intermediate the well casings, due to the guiding and pulling effect of the reduced-pressure areas upon the high-pressure medium flowing from the other well casing. This path of travel is indicated in dotted lines in FIG. 3 for a series of well casings in which a central casing is considered to be acting as a driving casing for forming tunnels to the four adjacent receiving casings 1052. It is contemplated, however, that each well casing in turn will function alternately as driving and receiving stations for each of the adjacent well casings, thereby permitting the establishment of tunnels simultaneously between a plurality of adjacent well bores.

Figure 3:
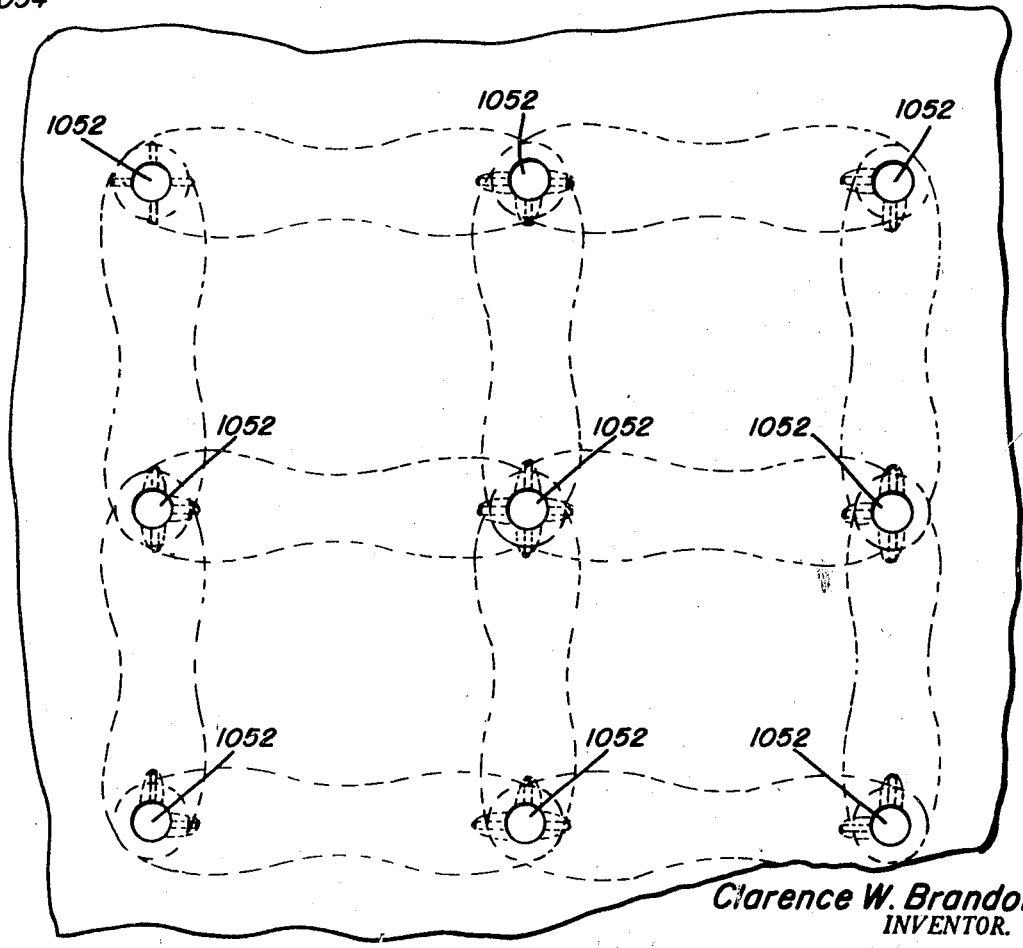

In the arrangement of FIG. 3, it is intended that any desired system of control may be utilized to effect the above-mentioned alternating operation of the driving and pulling force applied to the fluid medium, this feature of the invention being readily adaptable to a large number of arrangements.

In accordance with the above-described operation, as suggested in FIG. 3, it will be readily seen that a plurality of nozzles 1060 may be utilized in one or more of the casings in order to simultaneously tunnel toward a plurality of adjacent casings. Since, however, this application of the principles of this invention involves merely a duplication of equipment, and constitutes no change in the fundamental principle and intent of the invention, further illustration and explanation is deemed to be unnecessary.

As hereinbefore described, it is believed apparent that it is entirely feasible to establish and create by the above-mentioned hydraulic mechanism and operation any desired tunnels between selected well bores or from any well bore out into the formation. However, this hydraulic operation may be utilized either in conjunction with the mechanical cutting device previously set forth in my prior copending application Ser. No. 611,082, or alone and by itself as a cutting agent for undercutting, channeling, penetrating, and disrupting the oil strata. In considering the function of the hydraulic operation, the particular nature of the capillary formation of the oil strata should be particularly considered.

The period of high pressure of the fluid upon the face of the strata may be maintained for any desired period of time as dictated by experience to permit this increase of the pressure within the pores of the formation, at least in those pores contiguous to the face of the formation. It is contemplated that when the hydraulic operation is first started, the high pressure may be sustained for several hours if necessary, while the vibrations and oscillations are being applied. However, as the strata formation is being attacked and penetrated and the oil and gas deposits thereof are loosened, the duration of the high pressure necessary to penetrate will decrease with intervals as low as a few minutes being sufficient.

Obviously, this process will result in increasing the diameter of the passages or tunnels produced by the tunneling device and this process will be continued and can be continued as long as necessary to attain tunnels of any desired diameter.

Still further, however, if this tunneling, by pulsations and vibrations is continued sufficiently, it is evident that the entire sand formation may be undercut and collapsed or disrupted, thus effectively breaking the capillary lock and permitting the recovery of the oil deposits therein.

By virtue of the pulsating and high-frequency vibration of the pressure medium, it is evident that a surging and washing action of the gases and oil between the sand particles is effected which will efficiently strip both the mobile and the immobile oil particles therefrom, rendering still more efficient the oil recovering from the strata.

Moreover, I may in some instances introduce into the pressure medium and present at the oil and gas front in the strata inert gases such as carbon dioxide and fluids which will liquefy or dissolve under the peak pressures of the pressure medium whereby they will be carried into the pores of the strata formation; and will vaporize or come out of the solution when the pressure is reduced, to thereby assist in bursting and tearing the strata formation.

When the above-described hydraulic operation is utilized, the internal pressure of the formation either the formation pressure or that pressure augmented and raised as set forth hereinbefore, will cause the same to readily burst outward under this internal pressure. This will result in an outflow of oil, water, and gas from the strata into the disrupted area thereby producing a continuous yield of oil during this operation; and effecting a cleansing or scavenging of the disrupted area by the outflow of material therefrom.

In some instances, I may apply fluid pressure into the formation in advance of the tunneling or disrupting operations. This applied pressure will raise the internal pressure of the formathis application constitutes subject matter disclosed by identical FIGS. 1 through 14 of my U.S. Pat. No. 3,302,720 issued Feb. 7, 1967 whose application Ser. No. 611,082. FIGS. 1-3 and 8-11 of this application are also identical with, and describe subject matter described by FIGS. 9, 4, 5, and 15-18 respectively, of my prior application Ser. No. 241,647, filed Aug. 13, 1951, part of which issued as U.S. Pat. No. 2,796,129 on June 18, 1957. My application Ser. No. 241,647 was copending with my above referred to application Ser. No. 665,995. My application Ser. No. 611,082 also constitutes a continuing application of my Ser. No. 296,038, filed July 27, 1952, portions of which are now U.S. Pat. No. 2,866,509.

Referring first to FIG. 1 for an explanation and understanding of a preferred manner of establishing tunnels between predetermined well bores, it will be seen that a pair of casings 1050 and 1052 in adjacent well bores, either existing or provided for the purposes of this invention, extend into an oil sand strata 1054, which lies above a bedrock strata 1056 and a superincumbent cap rock strata 1058. In accordance with one method of this invention it is proposed to establish tunnels between these two well bores by the use of hydraulic fluid upon which are imposed high-frequency vibrations.

As illustrated, from the bottom of one or both of the casings 1050 and 1052 there are laterally directed the nozzle portions 1060 and of the hydraulic tunneling devices by means of which hydraulic fluid is directed towards the opposite well casing to which it is desired to extend the tunnel. Optionally both nozzles may be operated simultaneously in order to drive two tunnel sections toward a junction with each other although alternatively, one nozzle alone can be employed to drive the entire tunnel to the other well bore.

Although as illustrated the method and means are employed to produce a tunnel between two well bores, it is obvious that tunnels may be laterally projected from a single well bore in any desired direction, in accordance with the position or positionings of the nozzle 1060.

Referring now to FIG. 1 there is disclosed a form of apparatus which is especially suitable for this tunneling operation. Disposed within the casings 1050 and/or 1052 is a tubing 1062 which, at its lower end, has a curved laterally extending terminal portion 1064 terminating at the side of the casing and being positioned and directed in opposed relation to the face of the oil sand strata and in substantial alignment with the other well casing to which the tunnel is to be established. Slidable within the tubing at its terminal portion is a flexible conduit 1066 having upon its lower end the above-mentioned nozzle portion 1060. A cable 1068, or other suitable means, operating in the desired manner, provides means whereby the flexible conduit may be moved downwardly in the tubing and extended laterally from the terminal portion thereof to thus feed the nozzle into the strata being tunneled as the tunnel is being formed and progresses toward the other well bore, and to maintain the discharge end of the nozzle in contact with the formation to be penetrated.

In the well bores, at the lower ends of each of the casings 1050 and 1052, there is provided an arcuate guard or shield 1070 which is substantially concentric with the lower portion of the curved terminal 1064 of the tubing and which directs the return flow of the pressure medium into and up the casing as indicated by the arrows in FIG. 1.

In contrast with the usual manner of merely supplying a fluid medium under pressure through the nozzle 1060 and attempting to increase the pressure thereof until the same, by sheer force, penetrates the oil sand strata and reaches the other well bore, or establishes a junction with the other tunnel section being started from the well bore, the present invention in general consists in rendering the pressure of the fluid medium more effective to penetrate the strata by causing successive pressure fluctuations of the pressure medium at the face of the strata and within the interstices thereof.

These fluctuations subject the face of the strata and the face of the material within the interstices of the strata to pressures which are alternately greater and less than the pressure within the strata. When the pressure of the pressure medium exceeds that within the strata the latter will be augmented or raised, especially in that portion nearer the face of the strata. When a converse condition exists, the internal pressure within the strata will forcefully burst or explode the face of the strata outwardly, disrupting the same.

This disrupting of the capillary formation of the strata is greatly augmented and hastened by increasing the extremes between the high and low pressures applied to the strata; by increasing the surging of the pressure medium within the pores of or against the strata by imparting high-frequency vibrations to the pressure medium; and by increasing the eroding action of the medium within the pores of the strata by the preceding processes.

In initiating the tunneling operation, the fluid medium is supplied under pressure from any suitable source by the conduit 1072 into the tubing 1062 and discharged from the nozzle portion 1060 against the face of the oil sand strata as illustrated. This pressure medium will cut into and form a tunnel or channel in the oil sand strata, the material removed by the fluid medium being educted as indicated by the arrows in FIG. 1, upwardly in the casing 1050 and discharged from a conduit 1074 under the control of a valve 1076 through a control or operating member such as a cam 1078.

Obviously, if desired, the outflowing pressure fluid from the conduit 1074 may be returned to the conduit 1072 to cause a recirculation of the same during the tunneling operation.

As so far described, this circulation of the pressure medium will, in conformity with known procedures, cause some disruption of the strata. Regulation of the pressure in the conduit 1072 or of the valve 1076 or both will maintain any desired mean pressure upon the pressure medium. However, in addition to the circulation of the fluid medium under waves of various pressures, it is intended to render the excavating, penetrative, and disruptive action of the same more effective as well as more accurately directed and controlled by applying pulsations to the fluid medium and by imposing high-frequency vibrations thereon, the character of the pulsations and the vibrations being varied and controlled.

The casing 1050 is provided with an impulse producing means in the form of a piston 1080 reciprocable in a conduit 1082 under the control of an actuating cam 1084 or similar member, while the tubing 1062 is provided with an impulse-producing piston 1086 reciprocable in a conduit 1088 under the control of a cam or other actuating means 1090. There is further provided a pressure release valve 1092 operable in a conduit 1094 under the control of an actuating member such as a cam 1096.

By periodic and/or adjustable manipulation of the pistons 1086 or 1080, a pulsation or wave motion may be transmitted through the pressure medium which functions as an elastic or closed hydraulic column. The rigid column of the pressure medium will transmit the impulses or energy shocks, without substantial loss, to the strata. There, the pressure impulses pass from the denser transmitting medium to a more elastic resilient medium consisting of the oil particles and gas bubbles at the oil face of the strata and produce a turbulent washing of the latter into the formation. With the change of medium, the impulses are converted to vibrations whose pressure peaks have a much greater amplitude and this facilitates the above-mentioned washing and penetrating action and fracturing and disintegration of the formation.

By using both pistons 1086 and 1080, separate pulsations, each in a predetermined pattern or character may be separately produced and imposed upon the pressure medium within the tubing and casing, respectively, to produce a resultant vibration or wave. It should be noted that these two separate pulsations may be varied as to intensity, character and phase so as to reinforce, cancel, or modify each other so that the resultant pulsation may have much greater extremes between its high and low pressure, may have portions cancelled out by interference and otherwise altered as desired. Moreover, the speed of travel of the wave pulsations of piston 1086 to the nozzle and sand face is different from that of piston 1080, since in the first instance the velocity of the medium is added thereto while in the latter it is subtracted therefrom. This difference is utilized to properly time and synchronize the peaks and lows of the two waves to obtain a resultant wave having the desired predetermined peaks and valleys.

In applying this method of tunneling, it is intended that the fluid applied to the sand strata from the casing 1050 shall preferably exceed in pressure the pressure existing within the capillary formation of the oil sand strata. Consequently, the fluid will tend to be driven outwardly from the nozzle into this capillary formation, assisted by the pulsations and vibrations imposed upon the fluid, and toward the adjacent well casings. At the same time, pulsations of a similar character will be produced in the fluid being applied to the nozzle and the adjacent casing 1052. The pulsations from the driving casing 1050, if opposite in phase to that of the "pulling" casing 1052 will guide and augment the penetrative effect, since the oil sand strata therebetween will be subjected to a high pressure adjacent the casing 1050 at the same time that a greatly reduced pressure prevails at the casing 1052. This condition may be maintained for any desired length of time, this length of time being varied during the treating of the formation and is found to be most effective for penetrating the oil sand strata, but will be periodically reversed, whereby the casing 1052 becomes the driving casing and the casing 1050 becomes the pulling casing for the operation. It will be evident that this cycle of reversing the pushing and pulling effect upon the opposite ends of the sand strata between the two casings will tend to extend the tunnel sections toward each other under the pressure impulses and high-pressure conditions prevailing at their nozzles, and the low-pressure region created at one well will pull or guide the flow of pressure fluid from the high-pressure region of the other well casing toward the low-pressure region.

The effectiveness of this driving and guiding action upon the pressure fluid of the tunneling operation will be greatly augmented by the imposing of high-frequency vibrations thereon of predetermined character. The above-mentioned pistons will obviously be capable of variation in the extent and rate of their travel, to enable the attaining of any desired rate and amplitude of pulsations within the fluid medium. As will be understood, the form of apparatus set forth in the preceding sections of this application may also be effectively applied for this purpose.

The opening and subsequent sudden closing of the pressure medium discharge valves 1076 and 1092 with predetermined timing and adjustable rates of movement will set up, by a ram action, a hammering effect in the fluid columns of the tubing and of the casings. As is well known, this hammering effect is capable of producing relatively enormous and rapid pressure oscillations in the fluid column which will be transmitted and directed by the nozzle portions 1060. These oscillations will be imposed upon the above-mentioned fluctuations and vibrations, and may be united and combined to augment the pressure peaks or drops to further increase their differences. By using the appropriate combinations of one or both of the pistons and valves, an infinite variety of resultant frequencies of pulsations or vibrations are possible. As will be readily understood, the paths of travel of the fluid medium will be relatively wide adjacent the well casings from which they originate, and will tend to thin out or narrow intermediate the well casings, due to the guiding and pulling effect of the reduced-pressure areas upon the high-pressure medium flowing from the other well casing. This path of travel is indicated in dotted lines in FIG. 3 for a series of well casings in which a central casing is considered to be acting as a driving casing for forming tunnels to the four adjacent receiving casings 1052. It is contemplated, however, that each well casing in turn will function alternately as driving and receiving stations for each of the adjacent well casings, thereby permitting the establishment of tunnels simultaneously between a plurality of adjacent well bores.

In the arrangement of FIG. 3, it is intended that any desired system of control may be utilized to effect the above-mentioned alternating operation of the driving and pulling force applied to the fluid medium, this feature of the invention being readily adaptable to a large number of arrangements.

In accordance with the above-described operation, as suggested in FIG. 3, it will be readily seen that a plurality of nozzles 1060 may be utilized in one or more of the casings in order to simultaneously tunnel toward a plurality of adjacent casings. Since, however, this application of the principles of this invention involves merely a duplication of equipment, and constitutes no change in the fundamental principle and intent of the invention, further illustration and explanation is deemed to be unnecessary.

As hereinbefore described, it is believed apparent that it is entirely feasible to establish and create by the above-mentioned hydraulic mechanism and operation any desired tunnels between selected well bores or from any well bore out into the formation. However, this hydraulic operation may be utilized either in conjunction with the mechanical cutting device previously set forth in my prior copending application Ser. No. 611,082, or alone and by itself as a cutting agent for undercutting, channeling, penetrating, and disrupting the oil strata. In considering the function of the hydraulic operation, the particular nature of the capillary formation of the oil strata should be particularly considered.

The period of high pressure of the fluid upon the face of the strata may be maintained for any desired period of time as dictated by experience to permit this increase of the pressure within the pores of the formation, at least in those pores contiguous to the face of the formation. It is contemplated that when the hydraulic operation is first started, the high pressure may be sustained for several hours if necessary, while the vibrations and oscillations are being applied. However, as the strata formation is being attacked and penetrated and the oil and gas deposits thereof are loosened, the duration of the high pressure necessary to penetrate will decrease with intervals as low as a few minutes being sufficient.

Obviously, this process will result in increasing the diameter of the passages or tunnels produced by the tunneling device and this process will be continued and can be continued as long as necessary to attain tunnels of any desired diameter.

Still further, however, if this tunneling, by pulsations and vibrations is continued sufficiently, it is evident that the entire sand formation may be undercut and collapsed or disrupted, thus effectively breaking the capillary lock and permitting the recovery of the oil deposits therein.

By virtue of the pulsating and high-frequency vibration of the pressure medium, it is evident that a surging and washing action of the gases and oil between the sand particles is effected which will efficiently strip both the mobile and the immobile oil particles therefrom, rendering still more efficient the oil recovering from the strata.

Moreover, I may in some instances introduce into the pressure medium and present at the oil and gas front in the strata inert gases such as carbon dioxide and fluids which will liquefy or dissolve under the peak pressures of the pressure medium whereby they will be carried into the pores of the strata formation; and will vaporize or come out of the solution when the pressure is reduced, to thereby assist in bursting and tearing the strata formation.

When the above-described hydraulic operation is utilized, the internal pressure of the formation either the formation pressure or that pressure augmented and raised as set forth hereinbefore, will cause the same to readily burst outward under this internal pressure. This will result in an outflow of oil, water, and gas from the strata into the disrupted area thereby producing a continuous yield of oil during this operation; and effecting a cleansing or scavenging of the disrupted area by the outflow of material therefrom.

In some instances, I may apply fluid pressure into the formation in advance of the tunneling or disrupting operations. This applied pressure will raise the internal pressure of the formation and cause a driving of the oil and gas deposits thereof toward the lower pressure of the weakened or tunneled area.

Prior patent of C. E. Riestle, Jr., U.S. Pat. No. 2,547,778, issued Apr. 3, 1951, is a method for increasing the yield of oil from oil-bearing strata formation, wherein a portion of the strata is expanded, lifted, and fractured generally along horizontal planes of cleavage, by applying hydraulic pressures (as by pumping of fracturing liquids) down a well bore upwardly against an undercut portion of the strata, and thus (by exceeding the breakdown pressure of the formation) vertically raising the surrounding area of the strata.

The present invention contemplates an improvement of the method of the above patent by not only hydraulically lifting and fracturing the strata, but simultaneously therewith more completely and readily establishing an enlargement of the generally annular drainage basin about a well bore by disrupting the internal structure of the sand strata to increase the volume of the basin by release of the fracturing fluids from the fractured formation; and will enable the limits of the basin to be enlarged along predetermined desirable directional lines of travel.

In addition, the actual process of enlarging the collecting basin is accompanied by a more effective and simultaneous withdrawing and stripping of the oil deposits from the oil sands by use of the foregoing hydraulic wave and vibrational effects to enable their collection in the basin. Still further, this invention contemplates maintaining a minimum pressure in the basin during the above-mentioned pulsations and vibrations to hold the same expanded while gravel or sand is applied thereto to fill this space and assist in holding the raised strata in its elevated position, thereby facilitating drainage of the oil.

Moreover, by virtue of the hereinafter described Jamin effect of the high-frequency vibrations imposed on the pressure medium having gases therein, it may be possible in some instances to use the latter to elevate the formation without the necessity for adding a separate sealing means to the capillary formation to limit leakage of the pressure fluid therefrom, while selectively allowing penetration of the formation by the pressure medium.

A further essential difference between the operation of the process of the above-mentioned Riestle patent and my improved process resides in the great degree of increase in the safety encountered in my process in contrast with that of the patentee. In the patentee's invention, a certain minimum pressure is necessary to cause the desired elevation of the strata and to maintain the same in elevated condition; and upon this minimum pressure is applied further augmented pressures in order to continue penetration of the strata from the well bore. Consequently, there is a standing pressure which has a minimum value equal to that necessary to elevate and maintain the strata in elevated position, and which rises therefrom to much higher values which are necessary to cause penetration and disruption of the formation. In contrast to this, in this phase of my method, the maximum standing pressure is equal to the minimum standing pressure of Riestle, being that pressure necessary to elevate the strata and maintain the same in raised position, while the disrupting and penetrative operation is effected by temporary increases in pressure in the form of wave pulsations in the relatively low-pressure hydraulic elevating and supporting medium. This means that the standing pressure imposed upon the formation in my invention is maintained at a relatively low value with a consequent maximum degree of safety as regards possible damage to the apparatus, equipment, and formation.

The overloads or increases in pressure from this minimum standing pressure in my invention is extremely transitory in its nature, and while effective for the purposes of disrupting the strata, and recovery and reclaiming of the oil therefrom.

In the hereinbefore set forth method, it is possible to introduce sand or gravel into the formation during, and without interrupting, the hydraulic operation. This may be conveniently effected by the apparatus of FIG. 1, wherein a conduit 1098 communicates with the interior of the tubing 1062.

A hopper 1100 having means for filling the same, such as a removable cover 1102 discharges sand or gravel into the conduit under the control of the valve 1104.

The turbulence, vibration, and velocity of the fluid pressure medium in and from the tubing 1062, conduit 1066 and nozzle 1060 will convey the sand or gravel into the openings of the formation and tend to deposit it at the desired locations. In addition, I may introduce an inert gas into the water to assist in conveying the sand and gravel and directing its travel.

Attention is next directed to FIGS. 4-7 which are directed to the subject matter of multiple fracturing of a formation and correspond to and amplify the subject matter and disclosure of my above-mentioned prior application Ser. No. 241,647, filed Aug. 13, 1951, and particularly to FIGS. 6-8 therein.

In these figures there is shown a portion of the petroleum formation including the previously mentioned oil sand strata 1054 bounded by the bedrock 1056 and cap rock 1058 with a well bore 1050 disposed therein.

In these figures it will be noted that the well bore 1050, either cased or uncased, is disposed with its lower end closely adjacent to the bedrock underlying the oil sands 1054, and that a tubing string 1180 is introduced into the bore and extends downwardly therethrough, the tubing string terminating at its lower end in an outwardly flaring nozzle 1182 with a baffle plate 1184 which is also outwardly flaring and is disposed in lower spaced relation to the nozzle 1182.

The purpose of this construction is to ensure and effect uniform and complete fracturing of the oil sand strata by successive fractures at vertically spaced regions throughout the same. In conventional fracturing methods, the initial fracturing of a strata usually causes such escaping of the fracturing medium that successive fracturing operations are impractical if not impossible owing to the escape of the fracturing fluid through the previous fracture of the formation.

In the first step of this method, as shown in FIG. 4, the tubing 1180 with its nozzle 1182 and baffle plate 1184 is disposed adjacent the bottom of the strata and hydraulic fluid for fracturing or tunneling is forced downwardly through the tubing, is deflected by the baffle plate outwardly about the lower end of the well bore and into the undercut portion thereof, and is then passed upwardly through the well casing as shown.

As shown in FIG. 4, a first chamber 1186 has been enlarged or produced in the formation by tunneling and/or fracturing to provide a basin by the hereinbefore and hereinafter mentioned hydraulic and sonic wave excavating method, by the flow of hydraulic fluid in the direction indicated by the arrows in FIG. 4. The hydraulic fluid is forced downwardly through the tubing 1180, is deflected by the baffle plate 1184 outwardly about the lower end of the well bore and into the first chamber 1186, and is then passed upwardly through the well bore or casing as shown.

When this first chamber, or the undercut portion of the strata has reached the desired dimensions, the tubing string 1180 will be elevated to a desired position adjacent the upper end or upper portion of the chamber 1186 as enlarged, or into the position shown in FIG. 5, and a mass of cement or other sealer is then deposited through the tubing 1180 to substantially fill the chamber 1186 up to and about the lower end of the well bore and sealing the lower end of the same as well as the surrounding capillaries of the formation. If desired, a filling or base of lead wool or other formation sealing materials may be deposited upon the floor of the chamber prior to the introduction of cement thereinto.

During the cementing operation, the above mentioned pulsations and vibrations applied to the fracturing fluid and/or the cement may be employed to more completely impregnate the formation with cement or sealing material. After the cement has hardened, the flow of hardened fluid may be resumed and a second chamber 1188 may be in turn excavated. Thereupon, the tubing string may be again raised as shown in FIG. 6, and a third chamber 1190 excavated.

This operation will be continued until as shown in FIG. 7, the entire oil-bearing strata has been fractured at vertically spaced levels therethrough and then sealed from the well bore. As will be apparent from FIG. 7, each of the series of chambers is in turn filled with cement to provide a filling plug for the strata. This method is especially effective where it is desired to thoroughly and at successive vertical intervals fracture or penetrate the entire or any desired portion of the face of a strata and to overcome the previously mentioned difficulty arising from the loss of the fracturing fluid into the strata after the initial fracturing operation therein has been effected.

After the completion of the operation shown in FIG. 7, the well bore may be drilled through the cement plug thus formed in the strata in order to continue the well below the same if desired; or similar fracturing operations may be performed at other strata through which the well bore passes; or fracturing methods of any desired character may be employed for such strata, or any other well-treating operation may be enacted as desired.

High-frequency waves may be applied to either the fluid supplied into the tubing string 1180 or that flowing from the top of the well bore 1050 or both.

At this point it should also be noted that the delivery of hydraulic fluid through the tubing of FIG. 7 at the lower end of the casing and above the topmost surface of the cement plug may be continued, and this fluid will be forced to penetrate outwardly into the strata in planes above the undercut portion of the strata. The cement filling thus prevents the direct passage of the hydraulic fluid into the excavated face of the strata and and compels its introduction into strata above the weakened face and above the undercut portion. The pressure and impulses applied to this fluid will then serve to drive oil outwardly through the strata and press the same downwardly upon the undercut portion or portions, thereby splitting and breaking off the strata.

This fracturing of the strata and collapsing of the same in conjunction with the above-mentioned high-frequency vibrations and surges of the fluid in the strata formation will thus assist in dislodging or causing collapse of the entire undercut strata and will further facilitate the recovery of oil therefrom. As will be evident from the foregoing, this method of operation may be similarly applied to other conventional squeeze cementing methods and to fracturing methods such as that of Riestle.

This section of this specification contains the subject matter disclosed in my prior application, Ser. No. 241,647, in FIGS. 15–18 and described therein, together with additions and a more detailed disclosure pertaining to the subject matter which has resulted from actual operation and use of this subject matter in field tests and experimentation.

While I may make use of wave pulsations to transmit energy to and into an oil sand strata for promoting the recovery of oil therefrom, this invention further includes novel methods of transmitting energy by wave pulsations which are applicable in widely diverse fields of utility. Certain features of this invention, therefore, deal generally with the production of the wave pulsation or high-frequency vibration of predetermined characteristics and with improved methods for obtaining, with precision and certainty, a resultant wave having the desired characteristics. Toward this end, I may generate two or more individual wave pulsations in a medium, combining the same in various selected manners as set forth hereinafter in order to obtain a resultant wave of the desired characteristic. In addition, however, I further control the character of the primary wave pulsations, the characteristics of the resultant wave pulsations, and the time and manner of combining the primary wave pulsations by also varying the elasticity of the conducting medium or mediums and/or the speed of travel of the wave or waves through the medium or mediums, and even utilize different wave-transmitting media to further the foregoing.

Figures 8, 9:
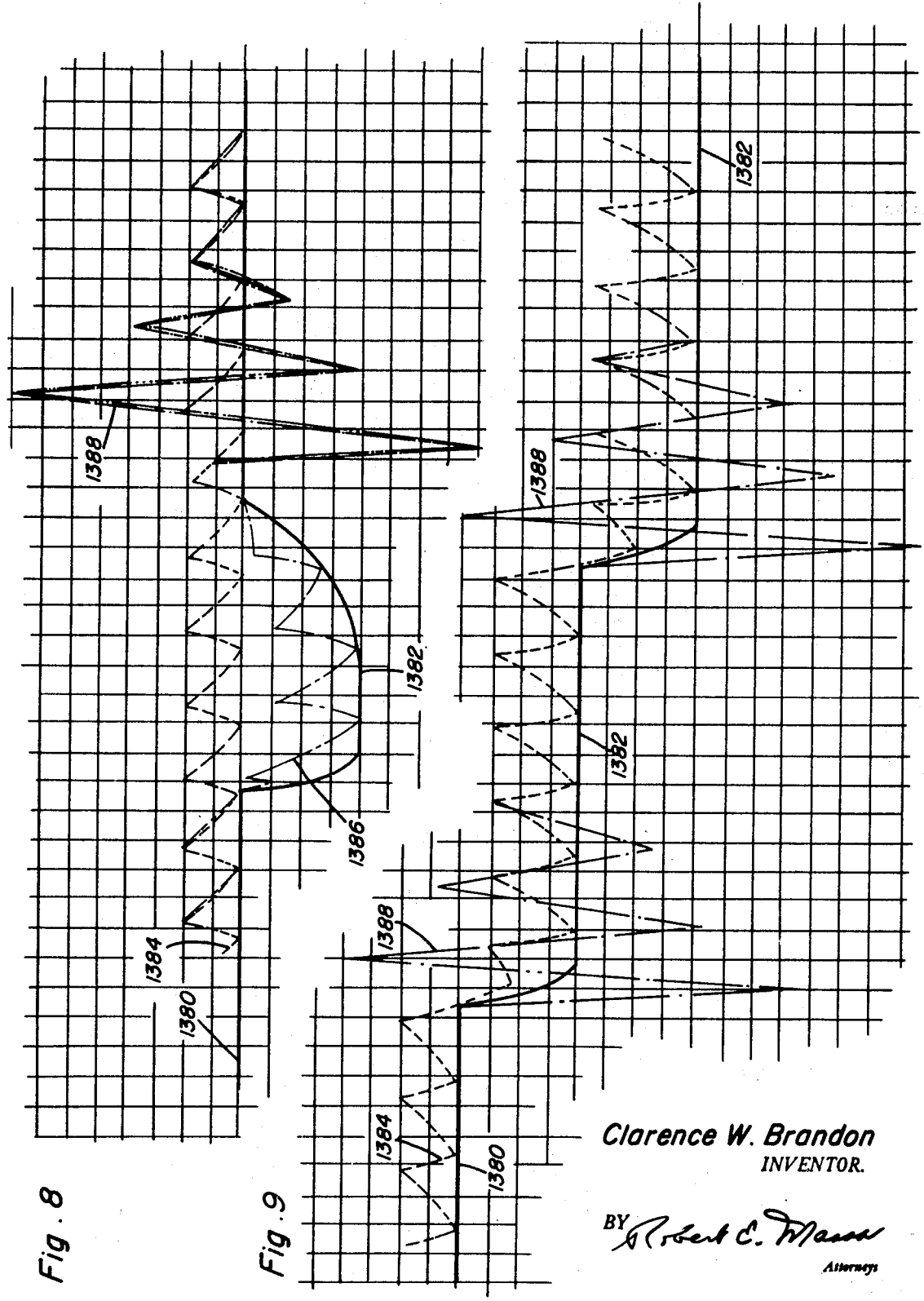

For a better understanding of this broad phase of my processes, attention is directed more specifically to FIG. 1 in conjunction with the diagrammatic charts of FIGS. 8–14. Referring first in the accompanying chart to FIGS. 8 and 9, it will be understood that the intervals upon the horizontal axis represent time intervals while those upon the vertical axis represent pressure increments. Indicated at 1380 is a curve representing a primary pressure wave or impulse having at predetermined intervals pressure drops 1382 therein. In FIG. 8 the primary pressure wave 1380 has a single pressure drop or pressure reduction at 1382, which may be repeated at a regular and selected time interval in accordance with conditions and practice effecting the use of the generated wave.

Where these waves are to be applied to treating oil sands, as by fracturing and acidizing, wherein inert gases may be included in the treating fluids, the pressure of the primary wave 1380 may be considered to be that pressure imposed upon a sand formation by a water or other pressure drive for repressuring the interior of the sand strata above its original standing pressure, or to act as a transducer from the wave generator to the formation, while the pressure reduction at 1382 would then represent a rarefaction or reduction of pressure at the face of the strata whereby the external pressure or the pressure of the drive imposed upon the strata has been temporarily lowered below the then existing pressure within the strata to permit the latter to disrupt the strata by bursting outwardly of the same. In such a use, it is obvious that the frequency of the depression periods 1382 will be determined by the rate at which the pressure of the primary wave 1380 is capable of penetrating and repressuring the interior of the strata.

For the more general purpose of this invention it will be seen that the curve 1380 thus represents a basic or primary pressure having any desired number of predetermined intervals of reduced pressure at 1382. Any of the piston or pressure producing members of the embodiment of FIG. 1 or even a separate apparatus may be utilized to produce this primary wave.

In the modification of this basic pressure curve as shown in FIG. 9, the pressure of the wave is depressed to provide a first depression 1382, which may be extended for any desired length of time, and which may be further depressed by a second or by a series of successive depressions 1382 appearing at the right of FIG. 9. It is obvious that any desired combination of these successive depressions and in any desired pattern may be applied to the primary or basic pressure wave represented by the curve 1380.

When this latter arrangement of FIG. 9 is applied to the treatment of oil sands, as by fracturing and acidizing, wherein inert gases may be included in the treating fluids, it will be observed that the pressure of the primary or basic pressure wave 1380 may be maintained for any desired length of time to repressure the formation; may then be reduced for a period of time to a pressure 1382 to permit a bursting or disruptive effect and may then thereafter subsequently be reduced still further to produce an additional or augmented bursting effect.

It is evident that the basic pressure wave 1380 may be generated in a medium of any desired character by various means and mechanisms, such as any of those previously set forth in this application or in my prior application, Ser. No. 296,038 now U.S. Pat. No. 2,866,509. Where the wave is to be propagated in a liquid medium, the forms of apparatus disclosed in this application will be found to be satisfactory. By way of example, in the apparatus of FIG. 1, the constant input of pressure fluid through the conduit 1072 together with the continuous but restricted flow of the fluid past the valve 1076 will enable the maintaining of any desired pressure upon the curve 1380, and this pressure may be reduced in any desired way, as for example, by reducing or throttling the input through the conduit 1072; opening wider the valve 1076; or opening auxiliary valves to relieve the pressure such as the valve 1092 or other ancillary valves, not shown.

In applying the apparatus of FIG. 1 and the energy wave diagrammed in FIG. 8 to treating a sand or permeable formation, as by fracturing or acidizing, wherein inert gases may be included in the treating fluid, it is contemplated that the basic pressure will be maintained for indeterminate periods of time as found to be necessary; will then be reduced in any of the foregoing manners for a period of time as found desirable;

may then be restored as in FIG. 8, or be further reduced as in FIG. 9, and this process continued. These variations will generally be of an irregular or nonrhythmic character, since usually the resistance of a sand formation will progressively decrease as the period of treatment continues. However, these variations or pulsations, it should be clearly understood, may be caused to occur at any desired interval or frequency.

In addition to the basic or primary pressure wave 1380 I may combine therewith and impose thereon one or more independently generated and controlled secondary pressure waves or pulsations. For simplicity of illustration, I have diagrammatically indicated the generation of one such secondary wave, although obviously any desired number of secondary waves may be generated and utilized as desired. This secondary wave is indicated in FIGS. 8 and 9 as a dashline 1384.

Such a secondary wave pulsation will be produced by one of the pistons 1086 or 1080 of FIG. 1, or one of the pistons of the pump cylinders 100 of the first-described apparatus herein, and as explained hereinbefore, the piston or pistons may be accurately controlled as to the length of stroke, time of stroke, and speed of travel so as to impart the desired characteristics to this pressure wave. Owing to the elasticity of the transmitting fluid medium, this secondary wave will travel through the medium and will have a directional effect from the nozzle 1060.

It is evident that by properly varying the operation of the piston or pistons, the secondary wave or waves 1384 thus produced may be combined with the primary pressure wave 1380 to produce a resultant wave having different characteristics from either. As shown in FIG. 8, the secondary wave 1384, if it were generated in a medium without the accompaniment of the primary wave 1380 would have the characteristics graphically indicated for the wave 1384 as the same extends straight horizontally across FIG. 8. However, when the wave 1384 is generated in a pressure medium in which the wave 1380 has been impressed, the variations 1382 of the wave 1380 will combine with the wave 1384 to produce resultant pressure variations designated at 1386.

The primary effect of combining these two waves, in the manner indicated in FIG. 8 will be to provide a pulsating peak for the wave 1380 in connection with a variably pulsating peak for the depression 1382. This latter peak or peaks will be less than the original pressure 1380 and more than the depression 1382 but will fluctuate therebetween.

This fluctuating effect will be found to be particularly efficacious for producing the above-mentioned fracturing or rupturing of capillary formations; causing washing and eroding of the same; and for agitating the material within such formations and breaking the inherence of oil and gas particles to the grain of the formation within the interstices thereof.

At this point, it should be observed that the graphs show only a second wave 1384 generated by one of the pistons. Obviously, both pistons may be employed simultaneously and may be so timed as to be in step with each other so as to produce an augmented pressure wave of the same frequency but of a much greater amplitude than that of the wave 1380 as shown.

It is further evident that the two pistons of either embodiment of apparatus disclosed herein may be out of step with each other to thus produce waves which will selectively interfere with each other to thereby produce speeds, reinforcements, or even neutralization and cancellation of the wave impulses. Where a complete cancellation occurs, the energy of the impulses will of course, be converted to a mere increase in pressure and/or heat in that area which may be utilized in oil recovery processes as set forth hereinbefore for the purposes specified.

I desire it to be noted, however, that in the apparatus as disclosed, the pressure medium is traveling downwardly in the tubing 1062 but upwardly in the casing 1050. Consequently the waves impressed thereon by the pistons will have different velocities of propagation with respect to the nozzle 1060, since in one instance, the wave velocity is traveling in the same direction as the travel of the fluid medium and therefore will be augmented by the velocity of the medium, while on the other instance, the wave travels against the direction of movement of the medium and will have its velocity diminished by the velocity of the medium. The two waves therefore require different lengths of time to arrive at the nozzle, and by virtue of this difference in the speed of travel to the nozzle, I am enabled to some extent to determine the phase in their cycle of vibration at which they are combined with each other, beyond the nozzle, and imposed upon the medium.

A still further function of the pistons, however, producing these secondary waves is that the movement of the pistons will tend to actually vary the pressure upon the transmitting medium and thereby alter its characteristic of elasticity adjacent the wave generator.

This pressure variation in turn can be employed to vary the intensity of the wave produced at the generator. It is my intention to make use of any and all of the above-mentioned variables in order to properly time and synchronize a secondary wave with the other secondary waves and/or with the primary wave 1380 to obtain the desired resultant wave therefrom.

Also indicated in FIGS. 8 and 9 by the numeral 1388, in long and short dashlines, or high-frequency oscillations forming a third or tertiary wave which may be simultaneously applied to the transmitting medium. This tertiary wave, in the forms of apparatus disclosed in this application, is generated by the ram or hammer effect produced as by closing the valves 1076 and/or 1092 of FIG. 1. In order to generate this wave, I open either of these valves or both for the necessary length of time to start the flow of the pressure medium past these valves. Then, upon closing these valves at a controlled rate, which will preferably be a substantially instantaneous closure, I suddenly stop the travel of the fluid column. The inertia or ram effect of the same, which will be relatively enormous for such operations as the hydraulic treatment of oil strata and the like, will produce an enormous pressure surge in the medium beginning at the valve and head of the casing, traveling downwardly through the fluid column to the face of the sand strata, then returning to the head of the casing and eventually dying out after oscillating through the fluid medium.

The amplitude and strength of this hammer impact can be readily varied by controlling the speed of flow of the fluid allowed to escape past either or both of these valves. Obviously, the maximum effect will be obtained when the maximum flow has been achieved in the fluid column passing through the valves, prior to the instantaneous closing of the valves.

In addition, the initiation of these hammer impulses, can be readily timed and synchronized with any phase of the primary wave 1380 or secondary wave 1384 or resultant thereof.

In FIG. 8 is shown the imposing of this tertiary wave upon the secondary and primary waves any time when the basic or primary has resumed its original pressure, the resultant wave of these three component waves thus reached a maximum peak.

In FIG. 9 is shown a similar condition with a tertiary wave 1388 combined with each of the reductions 1382 of the primary wave at the beginning of the reductions.

Figure 10:
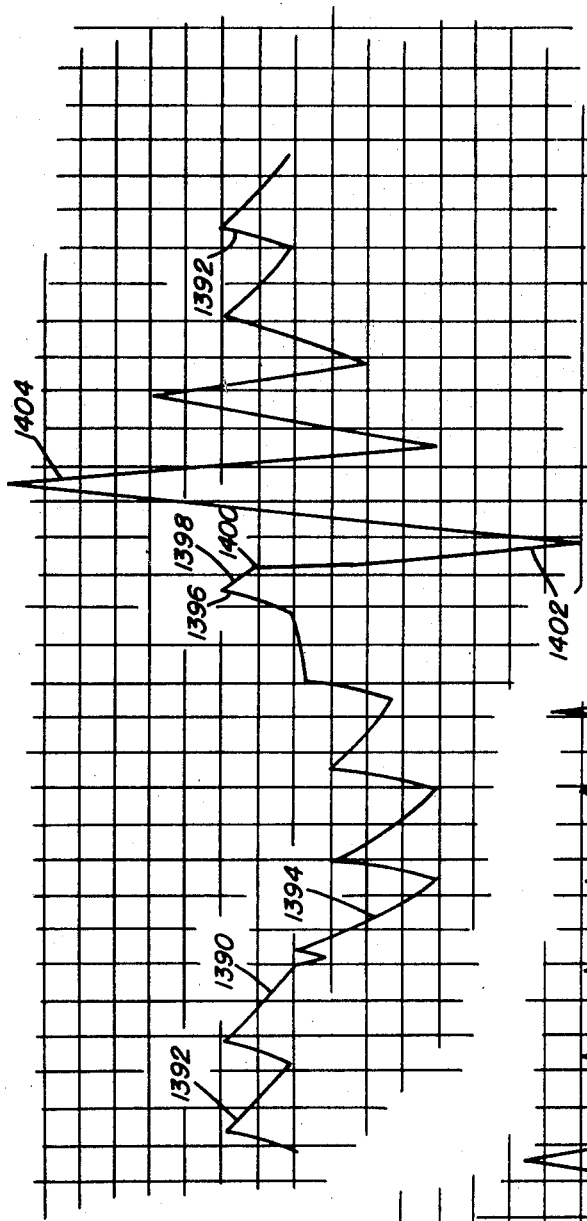

Indicated in the graph of FIG. 10 is the resultant curve indicating the character of the resultant pulsation wave obtained by combining the three pulsations designated by the curves 1380, 1384 and 1388 of FIG. 8. From this graph it will be apparent that a normal peak pressure indicated at 1392 is maintained, this pressure being fluctuated by the depressions between the peaks, together with a pressure reduction portion indicated at 1394, which in itself is of a fluctuating nature and which gradually retracts the normal pressure peak 1396 of the same value as the pressure peaks 1392. At this point, the ram effecting valve is opened producing a pressure drop as at 1398 and upon closure of the ram valve at 1400, the inertia of a moving column produces the pressure extremes at 1402 and 1404.

When this type of pulsation is applied to treating an oil strata as set forth hereinbefore, it will be apparent that the peaks 1392 maintain a pressure against the oil strata face which is in excess of the internal pressure of the same, thereby raising the internal pressure in the capillary formation. Since this pressure is pulsating, however, a surging or movement of the fluids within the capillary formation will be effected, tending to remove and loosen oil deposits and other material therein. When the reduced portion 1394 of the graph is approached, the corresponding pressure drop of the pressure medium upon the face of the formation will cause the external pressure to be lower than the internal pressure, thereby resulting in an outward bursting or fracturing of the outer sills or pores of the formation. It will be observed that this reduced pressure is also pulsating, thereby continuing the above-described surging action of the medium and the material within the formation and tending to withdraw and remove the disrupted or fractured positions therefrom. A vastly greater hammer blow is then applied by the pressure variations of 1402 and 1404, producing a major shattering effect upon the formation.

Figure 11:
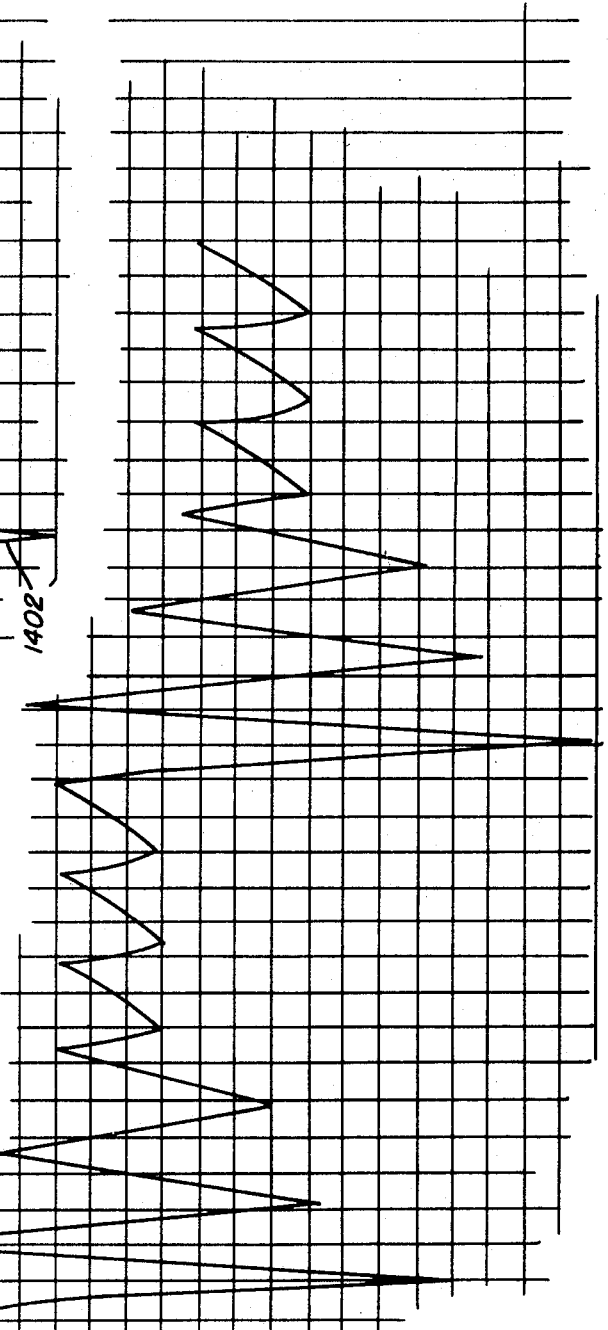

In FIG. 11 there is disclosed a modified curve 1406 which is similar to the curve 1390 of FIG. 10 and represents the resultant curve and characterizes the resultant high-frequency pressure wave of the medium which is obtained by combining the basic pressure curve 1380 with its two or more successive pressure drops 1382, with the secondary pressure waves 1384 and a tertiary wave 1388.

The features of the curve 1406 are similar to those of the curve 1390 except that two or more successive pressure reductions are sequentially effected at the base of a formation, each of these pressure reductions being accompanied by the tremendous pressure impacts of the tertiary curves while continuing the pulsations of the secondary pressure waves. The operation of this form of wave, illustrated by this curve, will be readily apparent from the foregoing description.

It is of extreme importance to note that in the method as disclosed hereinbefore, a pressure medium such as a liquid can be given a basic or primary pulsation to cause the same to apply a predetermined but readily variable initial loading action upon a material, may be further given secondary wave impulses of a predetermined pattern to effect turbulence in the conveying medium and agitation upon the material being treated, and finally may be hammer blows of relatively enormous magnitude with a relatively low rate of power input by virtue of the hammer effects obtained. The vibration exciting elements, in the form of pistons and valves may obviously be very exactly controlled and offer an extremely satisfactory means for producing precisely timed impulses of a predetermined character. In contrast with usual methods for producing high-frequency vibrations the valve and piston means of this invention enable me to utilize and impart to the medium forces of substantially any desired magnitude as contrasted with vibration producing means of very limited power input such as vibrating wires or the like.

The foregoing methods of wave generation and propagation as set forth hereinbefore in this section are those disclosed in my prior applications, Ser. Nos. 241,647, now U.S. Pat. No. 2,796,129; 296,038, now U.S. Pat. No. 2,866,509; and 491,715, now abandoned. Subsequent to the filing of these prior applications, extensive tests, research, and experimentation have been made, as a result of which the disclosure of my prior above-mentioned applications has been proved accurate, and this prior disclosure is amplified in detail and further developed as set forth hereinafter.

By applying sufficient acceleration to a reciprocating piston moving against a confined fluid column, a sonic wave comprising a high-frequency energy-carrying wave is produced in the fluid column as explained in detail in my prior application, Ser. No. 296,038, now U.S. Pat. No. 2,866,509. As used therein and in this specification and claims, the term "high frequency" identified frequencies of vibration ranging upward from 15 per second, although in exceptional circumstances they may range from 1 per second. Although the physical structure of the apparatuses disclosed herein differ from that set forth in the last-mentioned application, the principle of operation, as regards the production of a sonic wave, is basically the same.

Briefly, each outward stroke of the piston against the fluid column produces a compression therein, and upon the inward or return stroke, the velocity and/or acceleration of the piston is such as to cause the same to leave or separate from the fluid column thereby producing a rarefaction therein. The series of alternate compressions and rarefactions thus produced constitute and/or produce an energy-transmitting sonic wave in the fluid medium.

Use is made of the rarefaction condition to secure an introduction into the fluid column of additional fluid. In the form of apparatus disclosed in FIG. 1 herein, the operating pistons of the wave generator may have a spring-loaded valve in the heads thereof so disposed that the valve on the piston return stroke tends to be opened by its own inertia and tends to remain with the fluid column with which it is in contact on the outstroke of these pistons, so that on the return stroke of the pistons the inertia of the additional fluid taken into the interior of the pistons will pass through the opened valve and into the rarefaction zone immediately adjacent the piston head.

Consequently, when the piston has substantially completed its return movement, this additional fluid introduced between the piston and its valve and the fluid column is compressed into the fluid column, the additional or introduced fluid thereby resulting in and producing an increase in pressure in the fluid column with a resultant augmenting of the energy content of the condensation portion of the sonic wave and therefore of the energy content of the sonic wave propagating outward from the generator, and in the case of a standing wave resonating in the fluid column.

The pistons and/or valves of the apparatus hereinbefore described may be operated so as to produce cavitation or a cavitating effect in the medium in which a wave is being generated and at the generator.

The term "cavitation" as employed in connection with this invention designates the production of a succession of regions of rarefaction in a fluid each immediately adjacent a zone of compression of the fluid and effecting this rarefaction by a displacement of the fluid from the region of rarefaction faster than the fluid can flow into the region of rarefaction.

There results a "cavitational" effect or release of energy, from a wave cycle or group of wave cycles where a lead or lag at the moment of greatest rarefaction causes a rarefied zone of intense low pressure, compared to the rarefaction portion of the wave cycle or group of wave cycles it modulates.

Immediately following this intense low pressure portion of a wave cycle or group of wave cycles, the condensation portion of the wave has an impactual increase of amplitude substantially proportionate to the intensity of amplitude of the prior cavitational low-pressure portion of the modulated wave.

Figure 12:
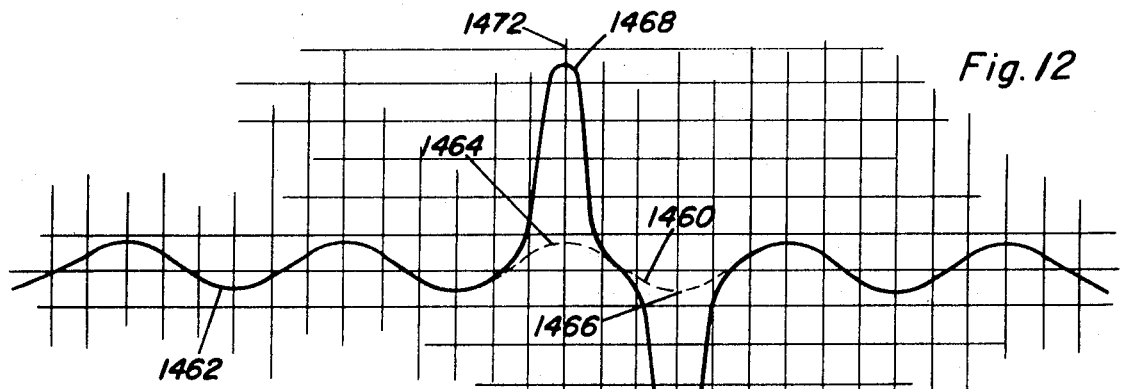

Further, after the creating and/or augmentation of and maintaining of a sonic standing wave in a fluid column as set forth hereinbefore, and at a point beyond the creation of and augmentation of the sonic wave by means of the introducing of additional fluid into the fluid medium of the fluid column, in accordance with a well-known basic principle of wave mechanics, the withdrawal of fluid and energy from the fluid column at the rarefaction portion of the sonic wave results in increasing or greatly augmenting the energy content of that wave cycle from which energy was withdrawn, this being shown in FIG. 12.

The graph of FIG. 12 shows by the dotted line curve 1460 a normal or regular wave. The full line curve 1462 indicates the resultant wave when energy is added thereto during a particular portion of the normal wave. Thus at 1464 and 1466 are shown the peaks of the compression and rarefaction phase of the normal wave 1460 while at 1468 and 1470 are shown the compression and rarefaction peaks of the augmented portion of the augmented wave 1462. It will be observed that the frequencies of the normal and augmented waves are unaltered with the augmented peaks of compression and rarefaction of the augmented wave occurring at the same time intervals 1472 and 1474 as the corresponding peaks of the normal wave, the difference being only those of amplitude.

Figure 13:
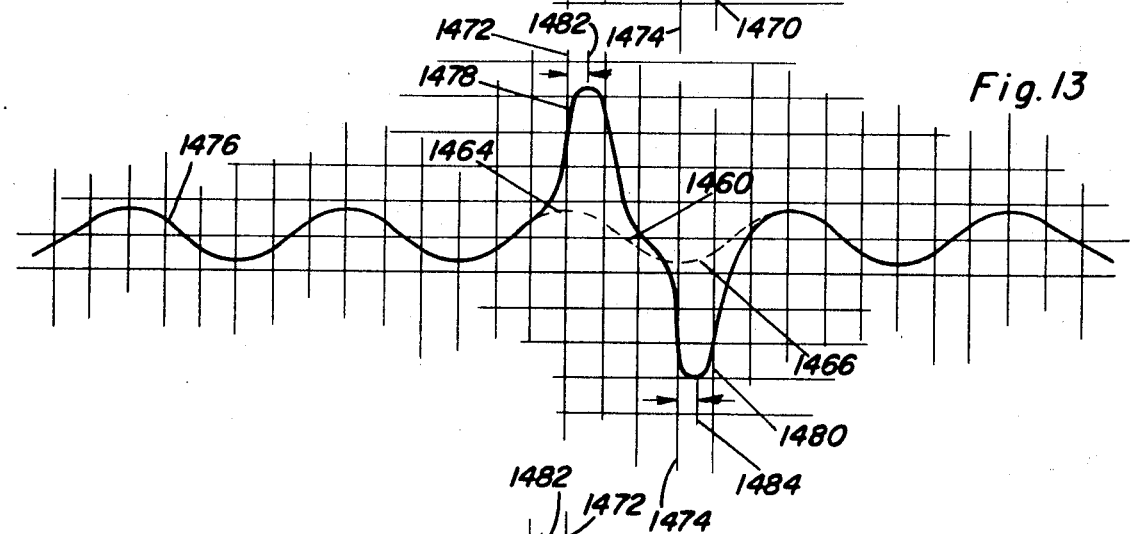
Figure 14:
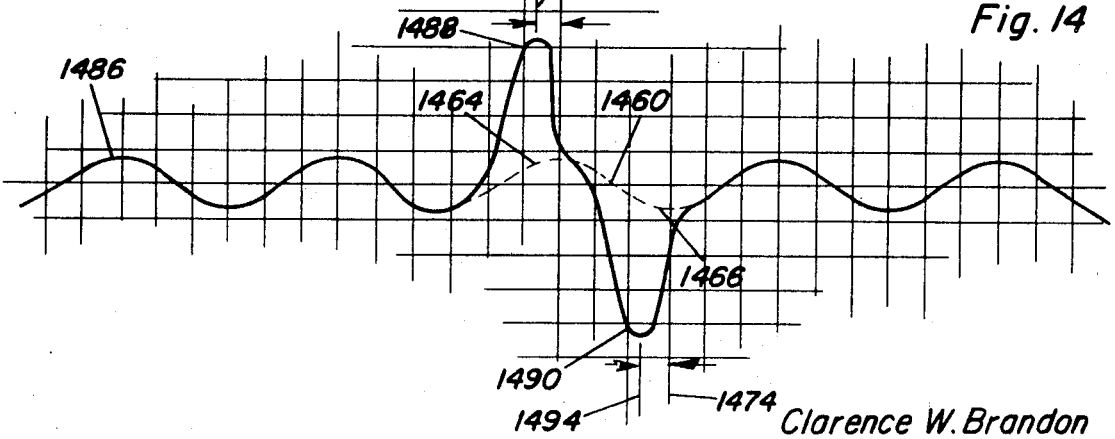

Also referring to FIGS. 13 and 14, if the energy withdrawn from the rarefaction portion of the sonic wave is removed before or after the moment of greatest rarefaction, there results a corresponding shifting of phase of the wave cycle or group of wave cycles in which and during which this energy is withdrawn with respect to the phase of the other wave cycles from which there is no withdrawal of energy. Moreover, as the place of withdrawal of energy is removed further from the place of greatest rarefaction in the cycle of a wave, up to a point 90° from the moment of greatest rarefaction, the phase shifting of that cycle or group of cycles is proportionate thereto, although the intensity of the said wave cycle or group of wave cycles is diminished with the increase of the phase shift thereof.

When the phase shift due to the withdrawal of energy is caused to occur after the moment of greatest rarefaction, there is produced a lagging or pulling effect by the wave cycle or group of wave cycles which effect increases in intensity up to a maximum of 90° after the moment of greatest rarefaction although there also results some diminution of the energy content of the thus modulated wave cycle or group of wave cycles.

The graphs of FIGS. 13 and 14 are similar to those of FIG. 12 but illustrate the effects of causing a leading shift and the lagging shift respectively of a wave by augmenting a wave through introduction of energy into a compression phase (or its equivalent, a withdrawal of energy during the rarefaction phase, or both) with a phase timing which leads or lags the phase timing of the normal wave. In each figure the normal wave 1460 has its compression and rarefaction peaks 1464 and 1466 at the time intervals 1472 and 1474 respectively.

In FIG. 13, however, the augmented leading wave 1476 has its augmented compression peak 1478 and rarefaction peak 1480 occurring at the time intervals 1482 and 1484 respectively. As will be seen, the peaks of the augmented wave are thus shifted or phase-displaced to lead the peaks of the normal wave. However, this displacement or shift in phase exists only in those wave cycles, during which the augmentation of the wave was effected.

In FIG. 14, the reverse condition is caused, with the augmentation and phase shifting effecting a lagging of the normal wave 1460 by the augmented wave 1486. Here, the augmented compression peak 1488 and rarefaction peak 1490 are phase-displaced rearwardly, relative to the normal wave as shown by the intervals 1492 and 1494.

The above set forth principle of producing a lagging effect in the phase relation of certain cycles of an energy-carrying wave can be advantageously employed in the treatment of cellular or porous structures such as those of the productive strata in oil bearing formations. Productive oil or gas in this particular type of use, the lagging or pulling effect of an energy-carrying wave in formations having strata of varying permeability (as in petroliferous formations with strata of relatively greater and lesser permeabilities), the strata of less permeability can be more effectively disrupted and disintegrated and fractured than those strata of greater permeability, by an increase in lagging or pulling effect previously mentioned. I have conclusively demonstrated by actual test that the most effective disrupting, disintegrating, and fracturing of all types of permeable formations is obtained by this lagging or pulling effect.

While the reasons for this effect are not conclusively known, it appears from the positive data of numerous tests that a tenable explanation for this phenomenon may be as follows: When the pressure upon the exterior face of a strata is lowered (as during a rarefaction period in the cycles of an energy-transmitting wave) below the internal pressure of the strata, the latter tends to force the fluids existing in the interstices of the strata out through the face thereof with a force which is proportioned to the difference of the internal pressure and the depressed or lowered external pressure. Due to the restricted areas of the capillary passages and intersticial pore spaces of the formation there is a resistance to such flow of the fluids. Obviously in less permeable strata the resistance is considerably higher than in the more permeable strata, and this resistance may be such that where the internal pressures are insufficient to force the fluids therefrom, they may be effective to disrupt, fracture or shatter the outermost layers of the cellular structure of the formation. Therefore, since the lagging effect as previously mentioned and as shown in FIG. 14 results in an extension of the period during which the pressure reduction is maintained, that is, a lengthening of the time interval between the normal compression phase and the next adjacent augmented rarefaction phase by the time between the time intervals 1474 and 1494 on FIG. 14, there is the maximum tendency and opportunity for the internal pressures to produce this disrupted effect.

It has been conclusively demonstrated that the above-mentioned lagging effect of a sonic wave applied to a permeable formation is also extremely effective for removing material adhering to the exterior face of the formation such as mud cake or the like; and cleansing the intersticial spaces and pores of the formation at the base of foreign matter such as broken particles of the formation embedded therein, mud or filtered cake compacted therein, paraffin, asphaltic or other gummy deposits, basic sediment and the like. It is believed that the previously advanced theory in explanation of observed facts apply equally to this use, as do the advantages of variations and increase in the phase displacement during the lagging effect up to 90° from the point of maximum rarefaction.

Regardless of the explanations or reasons for the ability of a sonic wave with a phase displacement resulting in a lagging effect for cleaning the pores and face of a formation and removing foreign matter therefrom, it has been conclusively demonstrated by the use of this apparatus that this property is definitely a characteristic actual function of such a wave.

Advantages arising from this unanticipated and heretofore unknown property of a lagging effect or a retarded phase shift of an energy-carrying wave are that heretofore employed tedious, expensive and time-consuming operations for cleansing a formation and its intersticial and pore spaces for various reasons may be eliminated and the desired result obtained more effectively, more quickly and more economically by this method.

In carrying out this aspect of the lagging effect or phase retarding of a sonic wave, it should be noted that it is also possible to advantageously employ two separate wave generators coupled together and each operatively connected to the face of a formation and/or the bottom of a well bore. In such assembly, one generator will function as a means for circulating the pressure fluid, and producing an energy-carrying wave; while the other generator is employed as a means for producing an energy-carrying wave having predetermined characteristics, and having the aforesaid phase displacement or lagging effect in its energy-carrying wave.

For this purpose and method, optimum results are obtained by having one of the wave generators attached to tubing going to approximately the bottom of the well bore, the other generator being attached to the well casing or a separate string of tubing in like manner, the generators being in a different phase so that a simultaneous or resultant wave can be obtained at the junction of the two separate waves adjacent the face of the formation. In this manner, an open formation that has mud cake or cementitious particles thereon or one where the casing extends through the formation and is cemented therein and has been perforated so that the perforating jets or bullets have compacted the surface of the perforations in the formation, such perforations and formation can be cleaned of the substances and the formation disrupted, disintegrated, or fractured, and the material cleansed therefrom be removed by a circulation caused by one wave generator, with the other generator imparting a lagging or pulling effect to facilitate the removal of such substance.

When the phase shift in an energy-transmitting sonic wave which is caused by the withdrawal of energy is timed to occur before the moment of greatest rarefaction, then a leading or pushing effect is occasioned in that wave cycle or group of wave cycles, this effect increasing up to 90° after the moment of greatest rarefaction is approached, and there results a diminution of the energy content of that cycle in the same manner as for the production of a lagging effect. This leading effect and its phase relation to the cycles of a sonic wave for a 45° lead has been illustrated in FIG. 13.

At this point it should be observed from a comparison of FIGS. 13 and 14 with FIG. 12 that a 45° lead serves to displace the time or period of maximum or peak pressure of a wave cycle 45° forward in the travel of the wave, as seen from a comparison of 1472 and 1482 in FIG. 13, while as shown in FIG. 14, a lag of 45° serves to displace this maximum peak pressure 45° rearward of the travel of a wave, as shown by a comparison of 1492 and 1472 therein. It will be further noted that upon cessation of the phase displacing pulsative effect, the wave resumes its rhythmic cycles and phase relationship which existed prior to such displacement. Therefore, in the cycle in which the displacement exists, there is a change in the wavelength of that cycle with respect to the adjacent unaffected cycle, this wavelength being lengthened in a case of a leading effect and being reduced in a case of a lagging effect. The result of this displacement is to vary the time between the peak pressure of an unaffected cycle and the subsequent peak pressure of an affected cycle, the time being increased for a leading effect and decreased for a lagging effect.

The treatment of a formation by a pair of wave generators, one applying a leading effect and the other applying a lagging effect in alternation, has produced extremely beneficial results. The effect of the generator having a lead in a cycle or number of cycles of a wave is to produce an increased impact upon the face of a formation with a greater penetrating effect into the formation with a raise of the internal pressure thereof. When this is followed by a wave cycle or group of cycles having a lagging effect, the resultant increasing of the depression or rarefaction of the wave at the face of the formation and at the exterior thereof, when combined with the previous pressurizing effect obtains a greatly increased pressure differential between the interior and exterior of the formation and thus secures an optimum disrupting or fracturing effect thereon. This also greatly facilitates the removal of material particles as well as fluids from the interior of the formation.

After this treatment has been continued for some time, with fluid going into the formation, both wave generators may then be adjusted and synchronized or phased together to produce a lagging or pulling effect which will thus be of an increased amplitude. When the formation becomes more open, as indicated by an increase of fluid input and/or output, circulation of fluid for cleaning out the pores and intersticial spaces of the formation as described hereinbefore may be efficaciously employed.

When the face of the formation and well bore have been sufficiently cleaned by the preceding operation, the return to a medium extent of lag of both of the wave generators with fluid being introduced into both and discharged therefrom into the fluid column contacting the formation is continued, this energy input into the formation at a fairly low pressure being maintained for an hour or more. After it is estimated that the intersticial pores of the formation have been charged or pressurized with fluid sufficiently to act as pressure chambers, the natural cementing materials bonding the sand grains together acting as check valves to effect the accumulated buildup in these chambers of the sonic wave impulses, the average wave pressure is then adjusted to approximately half that of conventional formation-fracturing methods and is continued until a substantially complete fracturing of the formation results, each pore in the formation seeming to assist in the fracturing operation by its accumulated energy. Usually this final stage of the operation is completed in a very short time.

When sufficient formation thickness exists, a packer may be used in a well bore to divide the formation, enabling the use of two wave generators as above, each wave generator being operatively connected to one of the two divided sections. For this situation a slightly different method of operation, among numerous possible methods, may be employed. The formation and/or perforations are cleaned as set forth hereinbefore, and the sonic energy is applied as before to produce a buildup in the pressure accumulated within the formation, then circulation is started and continued into the formation at one side of the packer, through the formation and around the packer and out the other side thereof into the well bore.

During this circulation, the two wave generators maintain high-frequency sonic waves in the circulating medium with the fluid input generator increasing the pressure on the fluid and preferably applying a leading effect to the wave produced thereby. The other wave generator is timed with a heavy lag and with no fluid input. When the fracture occurs, the accumulated sonic energy with which the formation has been charged is released is pushed through the generator with no liquid input and with the heavy lag, and if the operation continues, the disintegrated material from the formation can be drawn from the formation and well bore to the surface through the generator having the lag.

In one well-treating operation performed with this machine, where a water flood had been in operation for some years, the above method of dividing a formation by a packer in the well bore was employed. When the formation fractured, the release of formation pressure back through the wave generator which was not inputting fluid but was pulling on the formation with a heavy lag, at the surface, was two times the original bottom pressure of the formation when wells were first drilled thereinto. Meanwhile, the heavy lag of this generator was continued and several barrels of disintegrated formation and other foreign matter were brought to the surface and this high pressure continued over half an hour.

During this period considerable pressure fluctuation ensued, seemingly from new sections of formations successively ruptured by the internal pressure and considerable amounts of shale sediments came up with the formation, evidently from the thin shale laminations in the formation. At times, disintegration was so complete that the disintegrated material of the formation coming up in the fluid composed half of the discharge from the well bore.

In the treatment of well bores and productive formations, the previously described leading effect of a wave generator seems best for rapidly driving oil to a production well from a water input well, especially when the producing strata is relatively uniform in permeability, and is most effective in spearheading into formations relatively plugged with foreign material or those of very low permeability, in order to introduce fluid by the sonic generator into the formation to act as a transducer to carry the wave and vibrations thereinto.

The withdrawal of energy from the moment of greatest rarefaction in the cycle or group of cycles of the wave an the intensifying of the wave thereby seems best useful in formation fracturing of well bores where relatively low permeability is encountered near the well bore, but where adjacent the well bore and out in the formation therefrom areas of greater permeability exist. For this condition, the vibrations of the regular wave from the generator resonate out into the formation and the heavy intense shocks introduced into the wave are conducive to fracturing the formation so that access can be had thereinto by the fluid to permeate areas in the formation whereby other treatments such as described hereinbefore can then be effectively given. These intense shocks can, of course, be produced in any suitable manner as by secondary generators as previously mentioned.

It is obvious that these apparatuses and the energy waves produced thereby can be beneficially employed in numerous uses of industry where pressure with vibrations and heavy shocks would be advantageous in contrast to the application of a steady pressure, however great. It has been demonstrated that a relatively lower pressure but with fluctuating peaks is more effective as a compressing or a propelling agent than is a high pressure maintained at static level.

In the use of this effect in well formation fracturing as well as other uses, this low-pressure zone will arrive at the area work is to be performed either before or after the intense high-pressure shock of the condensation portion of the wave cycle or group of wave cycles, depending upon the manner in which the cavitational effect is produced. In the apparatus of FIG. 1, the high-pressure zone preceded the low-pressure zone, whereas in the other form of apparatus disclosed in this application, the low-pressure zone preceded the arrival of the high-pressure zone.

Where the latter sequence occurs, as employed in the treatment of permeable substances such as productive strata of oil or gas formations, these low-pressure intense zones followed by the severe intense shocks of the high-pressure zones not only impacts at the face of the formation but follows the carrier wave or standing wave resonating into the formation and causes disruption of the formation or ejection of the same back into the well bore; or effects lifting of the overburden; and with the use of sand, either from the disintegrated formation or added to the fluid going into the well bore, causes an effective grooving or scouring within the interstices of the formation or the fractures produced therein to form or enlarge access channels for production of the formation into the well bore. The above method of scouring or eroding channels in a productive formation has been observed to happen to portions of a formation subjected to the operation of this apparatus.

What is claimed:

1. A method of recovering oil or gas from an oil- or gas-bearing strata penetrated by a well bore which includes,
    the step of effecting fluid pressure to the interior of the well bore upon the face of the strata by introducing a liquefiable gas under pressure into the strata,
    varying the pressure of the applied fluid above and then below the internal pressure of the strata immediately adjacent said face to cause thereby fracture and rupture of said face from the internal pressure of the strata, to substantially liquefy said liquefiable gas by said applied pressure and to cause vaporization of said liquefiable gas by said reduction of pressure at the face of the strata,
    whereby cleansing or scavenging of the disrupted area occurs by the outflow of material therefrom.

2. The method of claim 1, wherein the reduction of pressure at the face of the strata is effected by releasing pressure from the well bore at the wellhead.

3. The method of claim 2 wherein said fluids include an acidizing agent.

4. The method of claim 1, wherein said liquefiable gas is carbon dioxide.

5. A method according to claim 1, wherein said fluid is a strata-acidizing agent.

6. The method of claim 1, wherein said liquefiable gas is dissolvable within fluids of the formation or of other applied fluids under the peak pressures of said applied fluid pressure.

7. The method of claim 6, wherein said fluids include an acidizing agent.

8. The method of claim 2, wherein said liquefiable gas (scavenging the disrupted strata by being volatilized by said release of pressure at the wellhead), is carbon dioxide.

9. The method of claim 8, wherein said fluid includes an acidizing agent.

10. A method of disrupting permeable formations which comprises,
    introducing a liquefiable gas under a greater pressure than that existing in the formation,
    applying fluid pressure alternately to vaporize and liquefy said injected gas thereby to assist in rupturing the formation by the successive expansion and contractions of the introduced gas,
    scavenging the disrupted material from the disrupted formation by said liquefiable gas by reduction of pressure at the face of the formation.

11. The method of claim 10, wherein said liquefiable gas is carbon dioxide.

12. The method of claim 10, wherein the reduction of pressure at the face of the formation is effected by release of pressure at the wellhead.

13. The method of claim 12, wherein said fluid includes an acidizing agent.

14. The method of claim 11, wherein the reduction of pressure at the face of the formation is effected by release of pressure at the wellhead.

15. The method of claim 10, wherein said fluid pressure is applied by fluids in which said liquefiable gas is dissolvable.

16. The method of claim 15, wherein said fluids include an acidizing agent.

17. A method of undercutting a permeable formation penetrated by a well bore at a selected level therein comprising
    applying a pressure medium to a selected portion of a face of the formation,
    effecting said pressure by a gas liquefiable under the applied pressure,
    applying pressure pulsations to said medium to liquefy and vaporize said liquefiable gas and thereby producing fluctuating pressure differences between the interior and exterior of the formation at said portion of said face to thereby fracture and rupture said portion,
    scavenging material from the fractured and ruptured portion of the formation by vaporizing said liquefiable gas by reduction of pressure at said face of the formation.

18. The method of claim 17, wherein said pressure medium is a fluid into which the liquefiable gas is dissolvable under the applied pressure.

19. The method of claim 18, wherein said fluid is inclusive of an acidizing agent.

20. The method of claim 19, including the step of imposing on said pressure medium an additional high-frequency energy bearing wave to thereby modify said pressure pulsations.

21. The method of claim 20, wherein the additional high-frequency energy wave is applied at spaced time intervals to said pressure medium.

22. The method of claim 19, including the step of imposing on said pressure medium an additional high-frequency energy-bearing wave to thereby modify said pressure pulsations,
    said energy-bearing wave being applied to said pressure medium with a different phase relationship to that of the pressure pulsations.

23. The method of claim 18, wherein said liquefiable gas is carbon dioxide.

24. The method of claim 23, wherein said fluid is inclusive of an acidizing agent.

25. The method of claim 17, wherein the reduction of pressure at the face of the formation is effected by release of pressure at the wellhead.

26. The method of claim 17, including the step of energy-bearing wave to thereby modify said pressure pulsations.

27. The method of claim 26, wherein the additional high-frequency energy wave is applied at spaced time intervals to said pressure medium.

28. The method of claim 17, including the step of imposing on said pressure medium an additional high-frequency energy-bearing wave to thereby modify said pressure pulsations,
    said energy-bearing wave being applied to said pressure medium with a different phase relationship to that of the pressure pulsations.

29. The method of claim 18, including the step of imposing on said pressure medium an additional high-frequency energy-bearing wave to thereby modify said pressure pulsations.

30. A process for hydraulically fracturing a petroliferous subterranean formation penetrated by a well bore wherein fluid is pumped down said well bore and forced under pressure against the face of said formation,
    said fluid containing a gas which will liquefy under the pumping pressure,
    separately applying a cyclically varying pressure of relatively high and low pressure pulsations upon said fluid, the amplitude and frequency of which is controlled independently of the fluid pumping pressure and which is sufficient to overcome the breakdown pressure of said formation and thereby cause fracturing of said formation, releasing pressure from the well bore, and scavenging material and fluid from the fractured formation by the vaporization of said liquefiable gas.

31. The method of claim 30, wherein said fluid is inclusive of an acidizing agent.

32. The process of claim 30, wherein said pumped fluid contains a liquid in which the liquefiable gas is dissolvable.

33. The method of claim 32, wherein said fluid or said liquid is inclusive of an acidizing agent.

34. In a process for hydraulically fracturing a subterranean formation penetrated by a well bore wherein a fracturing fluid is pumped down the well bore and forced against the face of said formation under continuous and gradually increasing pressure until the pressure of said fluid against said face exceeds the breakdown pressure of said formation and causes said formation to fracture, and said pumping is thereafter continued to force said fracturing fluid against the face of said formation and into the fractures so formed to extend the length of said fractures, the improvement of which consists in introducing a liquefiable gas into said fluid being pumped against said face of the formation, said liquefiable gas being substantially liquefied under said pumping pressure, applying to the fracturing fluid in the well bore a cyclically varying pressure the amplitude and frequency of which are controlled independently of the pumping pressure, said cyclically varying pressure being applied to said fracturing fluid while continuing the pumping of said fracturing fluid against the face of said formation and said cyclically varying pressure being transmitted through said column of fluid and applied to said face of said formation as a cyclically varying pressure superimposed on said pumping pressure, releasing pressure from the well bore, and scavenging material and fluid from the fractured formation from the vaporization pressure of said liquefiable gas.

35. The method of claim 34, wherein an acidizing agent is included in said fracturing fluid.

36. The process of claim 34, wherein said liquefiable gas is dissolvable in the pumped or formation fluids.

37. The method of claim 36, including an acidizing agent in the pumped fluid.

38. The method of claim 35, wherein said cyclically varying pressure is applied only until the initial acidizing and fracturing of said formation occurs.

39. The method of claim 35, wherein said cyclically varying pressure is applied only subsequent to the initial fracturing of the formation and during the time when said acidizing and fracturing fluid is forced into the acidized fractures to extend the length of the same.

40. The method of claim 35, wherein the said cyclically varying pressure is applied prior to the initial fracturing of the formation and subsequent thereto during the time when the acidizing and fracturing fluid is forced into the acidized fractures to extend the length of the same.

41. A process according to claim 34, wherein said cyclically varying pressure is applied only until the initial fracturing of said formation occurs.

42. A process according to claim 34, wherein said cyclically varying pressure is applied only subsequent to the initial fracturing of the formation and during the time when said fracturing fluid is forced into the fractures to extend the length of the same.

43. A process according to claim 34, wherein the said cyclically varying pressure is applied prior to the initial fracturing of the formation and subsequent thereto during the time when the fracturing fluid is forced into the fractures to extend the length of the same.

44. A process according to claim 34, wherein the said fracturing fluid is pumped down the well bore through a well tubing string and the walls of said well bore is filled with a fluid to a height substantially above the location of said formation.

45. A method of recovering oil or gas from an oil- or gas-bearing strata penetrated by a well bore which includes the step of applying acidizing fluid pressure to the interior of the well bore upon the face of the strata, varying the pressure of the applied acidizing fluid above and then below the internal pressure of the strata immediately adjacent said face to cause thereby fracture and rupture of said face from the internal pressure of the strata, said pressurized acidizing treatment of said strata increasing the recovery of oil or gas from said strata.

46. That method of recovering oil or gas from an oil- or gas-bearing formation penetrated by a well bore which comprises applying an acidizing fluid under pressure into the well bore, applying alternate relatively high- and low-pressure pulsations upon the acidizing fluid and through the fluid to the face of the formation exposed to the well bore and thereby causing acidizing and fracturing of said face, continuing the application of the pressure pulsations until the face of the formation has been undercut with respect to the well bore, collecting and removing oil or gas released from the fractured and acidized formation.

47. The method of increasing productivity of oil or gas from an oil- or gas-bearing formation which comprises undercutting the formation contiguous to a well bore, applying an acidizing pressure fluid under a predetermined minimum pressure to cause vertical displacement of the formation above the undercut portion with resultant horizontal acidized fractures in the raised formation, applying pulsating pressure waves to the acidizing pressure fluid to cause fracturing and acidizing of the raised formation and extension of the acidizing of said formation and of the horizontal fractures while maintaining the raised formation in its vertically displaced condition.

48. The method of claim 47, including the step of applying sand or gravel into the undercut or extended portions while maintaining the raised portion in its lifted position.

49. A method of undercutting a permeable formation penetrated by a well bore at a selected level therein comprising applying an acidizing pressure medium to a selected portion of a face of the formation, applying pressure pulsations to said medium and thereby producing fluctuating pressure differences between the interior and exterior of the formation at said portion of said face to thereby acidize, fracture and rupture said portion and allow acidizing treatment of said selected portion of said face.

50. The method of claim 49, including the step of imposing on said acidizing pressure medium an additional high-frequency energy-bearing wave to thereby modify said pressure pulsations, said energy-bearing wave being applied to said acidizing pressure medium with a different phase relationship to that of the pressure pulsations.

51. The method of claim 49, including the step of imposing on said acidizing pressure medium an additional high-frequency energy-bearing wave to thereby modify said pressure pulsations.

52. The method of claim 51 wherein said added high-frequency wave is of the same frequency as that of the pressure pulsations of the acidizing pressure medium.

53. The method of claim 51 wherein the additional high-frequency energy wave is applied at spaced time intervals to said acidizing pressure medium.

54. The method of claim 51 wherein the energy-carrying wave is periodic.

55. A method of disrupting and acidizing permeable formations which comprises
    introducing a liquefiable gas under a greater pressure than that existing in the formation.
    alternately applying acidizing fluid pressure to vaporize and liquefy said injected gas,
    thereby to assist in rupturing and acidizing said formation by the successive expansion and contractions of the introduced gas.

56. A process for hydraulically acidizing and fracturing a petroliferous subterranean formation penetrated by a well bore wherein a fluid is pumped down said well bore and forced under pressure against the face of said formation,
    separately applying a cyclically varying pressure of relatively high- and low-pressure pulsations upon said fluid,
    the amplitude and frequency of which is controlled independently of the fluid-pumping pressure and which is sufficient to overcome the breakdown pressure of said formation and thereby cause acidizing and fracturing of said formation,
    continuing the application of said acidizing fluid pressure until the face of the formation has been undercut with respect to said well bore, and
    collecting and removing oil or gas from said well bore released from said acidized and fractured formation.

57. In a process for hydraulically fracturing and acidizing a subterranean formation penetrated by a well bore wherein a fracturing and acidizing fluid is pumped down the well bore and forced against the face of said formation under continuous and gradually increasing pressure until the pressure of said fluid against said face exceeds the breakdown pressure of said formation and causes said formation to fracture, and said pumping is thereafter continued to force said fracturing and acidizing fluid against the face of said formation and into the fracture so formed to extend the length of said fractures and the acidizing thereof, the improvement of which consists in
    applying to the fracturing and acidizing fluid in the well bore a cyclically varying pressure the amplitude and frequency of which are controlled independently of the pumping pressure,
    said cyclically varying pressure being applied to said fracturing and acidizing fluid while continuing the pumping of said fracturing and acidizing fluid against the face of said formation and said cyclically varying pressure being transmitted through said column of fluid and applied to the face of said formation as a cyclically varying pressure superimposed on said pumping pressure.

58. A process according to claim 57, wherein said cyclically varying pressure is applied only until the initial acidizing and fracturing of said formation occurs.

59. A process according to claim 57, wherein said cyclically varying pressure is applied only subsequent to the initial acidizing and fracturing of the formation and during the time when said acidizing and fracturing fluid is forced into the acidized fractures to extend the length of the same.

60. A process according to claim 57, wherein the said cyclically varying pressure is applied prior to the initial acidizing and fracturing of the formation and subsequent thereto during the time when the acidizing and fracturing fluid is forced into the acidized fractures to extend the length of the same.

* * * * *

UNITED STATES PATENT OFFICE
CERTIFICATE OF CORRECTION

Patent No. 3,640,344     Dated February 8, 1972

Inventor(s) Clarence W. Brandon

It is certified that error appears in the above-identified patent and that said Letters Patent are hereby corrected as shown below:

On the face of the patent, at "[73] Assignee:" replace "Orpha Brandon, Nashville, Tenn." with --Orpha B. Brandon, Nashville, Tenn., a part interest.--; at "[63]" delete "Continuation-in-part of Ser. No. 719,883, Apr. 9, 1968, abandoned." and replace with --Continuation-in-part of applications Serial No. 611,082, January 23, 1967, and Serial No. 719,883, April 9, 1968, which are continuations-in-part of application Serial No. 665,995, June 17, 1957, which in turn is a continuation-in-part of original applications Serial No. 296,038, June 27, 1952, and Serial No. 241,647, August 13, 1951.--.

Column 1, line 11, after "constitutes a" delete the rest of the paragraph to line 24, and insert the following, --continuation-in-part of Serial No. 611,082, January 23, 1967, and Serial No. 719,883, April 9, 1968 which are continuations-in-part of application Serial No. 665,995, June 17, 1957, which in turn is a continuation-in-part of original applications Serial No. 296,038, June 27, 1952, and Serial No. 241,647, August 13, 1951.--.

Column 4, line 73, after "611,082" insert --, filed January 23, 1967,--.

Column 5, line 1, after "disclosed" insert --and described--; line 3, after "application" insert --Serial No. 665,995 filed June 17, 1957 was copending with my above referred to application--; line 12, delete "." and replace with --through my prior copending application Serial No. 665,995, now U.S. Patent No. 3,302,720.--.

Column 8, line 22, delete "611,082" and replace with --241,647, now U.S. Patent No. 2,796,129,--.

Column 10, line 14, after "1951," insert --now U.S. Patent No. 2,796,129,--.

UNITED STATES PATENT OFFICE
CERTIFICATE OF CORRECTION

Patent No. 3,640,344                    Dated February 8, 1972

Inventor(s)  Clarence W. Brandon

It is certified that error appears in the above-identified patent and that said Letters Patent are hereby corrected as shown below:

Column 11, line 45, after "241,647," insert -- now U.S. Patent No. 2,796,129,--.

Signed and sealed this 29th day of August 1972.

(SEAL)
Attest:

EDWARD M. FLETCHER, JR.                 ROBERT GOTTSCHALK
Attesting Officer                       Commissioner of Patents